United States Patent
Abiprojo et al.

(10) Patent No.: US 10,309,677 B2
(45) Date of Patent: Jun. 4, 2019

(54) HVAC SYSTEM AIR FILTER DIAGNOSTICS AND MONITORING

(71) Applicant: Emerson Electric Co., St. Louis, MO (US)

(72) Inventors: Priotomo Abiprojo, O'Fallon, MO (US); Fadi M. Alsaleem, Troy, OH (US)

(73) Assignee: Emerson Climate Technolgoies, Inc., St. Louis, MO (US)

( * ) Notice: Subject to any disclaimer, the term of this patent is extended or adjusted under 35 U.S.C. 154(b) by 312 days.

(21) Appl. No.: 14/712,049

(22) Filed: May 14, 2015

(65) Prior Publication Data
US 2015/0330650 A1 Nov. 19, 2015

Related U.S. Application Data

(60) Provisional application No. 61/993,552, filed on May 15, 2014.

(51) Int. Cl.
*F24F 11/62* (2018.01)
*G05B 15/02* (2006.01)
(Continued)

(52) U.S. Cl.
CPC ............ *F24F 11/62* (2018.01); *F24F 11/30* (2018.01); *G05B 15/02* (2013.01); *F24F 11/47* (2018.01); *F24F 11/52* (2018.01)

(58) Field of Classification Search
CPC ............... F24F 11/006; F24F 11/0086; F24F 2011/0091; F24F 2011/0094; G05B 15/02
(Continued)

(56) References Cited

U.S. PATENT DOCUMENTS 6,216,066 B1 * 4/2001 Goebel ............. G05B 23/0232
340/438
6,448,896 B1 * 9/2002 Bankus ............ B01D 46/0086
236/49.3
(Continued)

FOREIGN PATENT DOCUMENTS

CN 1328744 A 12/2001
CN 1516807 A 7/2004
(Continued)

OTHER PUBLICATIONS

ITRC (Interstate Technology & Regulatory Council). 2013. Groundwater Statistics and Monitoring Compliance, Statistical Tools for the Project Life Cycle. GSMC-1. Washington, D.C.: Interstate Technology & Regulatory Council, Groundwater Statistics and Monitoring Compliance Team, printed from <http://www.itrcweb.org/gsmc-1/Content/GW%20Stats/5%20Methods%20in%20indiv%20Topics/5%205%20Trend%20Tests.htm> on May 31, 2015.
(Continued)

*Primary Examiner* — Robert E Fennema
*Assistant Examiner* — Christopher W Carter
(74) *Attorney, Agent, or Firm* — Harness, Dickey & Pierce, P.L.C.

(57) ABSTRACT

A system and method for monitoring a heating, ventilation, or air conditioning (HVAC) system of a building is provided. A monitoring server, located remotely from the building, receives operating parameter data from a monitoring device at the building that measures an operating parameter of the HVAC system. The monitoring server generates a plurality of data clusters from the operating parameter data, each data cluster corresponding to operating parameter data generated during steady-state operation of the HVAC system. The monitoring server calculates an average operating parameter value for each data cluster. The monitoring server calculates normalized operating parameter values based on normaliz-
(Continued)

ing the average operating parameter values for the data clusters over a predetermined normalization time period. The monitoring server compares the normalized operating parameter values with a threshold. The monitoring server determine whether an air filter of the HVAC system needs to be replaced based on the comparison and generates a notification based on the determination indicating that the air filter needs to be replaced.

16 Claims, 16 Drawing Sheets

(51) Int. Cl.
*F24F 11/30* (2018.01)
*F24F 11/52* (2018.01)
*F24F 11/47* (2018.01)

(58) Field of Classification Search
USPC .......................................................... 700/276
See application file for complete search history.

(56) References Cited

U.S. PATENT DOCUMENTS

| | | | |
|---|---|---|---|
| 8,160,752 | B2 | 4/2012 | Weaver et al. |
| 2012/0221150 | A1* | 8/2012 | Arensmeier ....... G05B 23/0224 |
| | | | 700/276 |
| 2012/0259583 | A1 | 10/2012 | Noboa et al. |
| 2012/0319851 | A1 | 12/2012 | Hoglund et al. |
| 2015/0027546 | A1* | 1/2015 | Bondeson ................. F17D 3/00 |
| | | | 137/1 |

FOREIGN PATENT DOCUMENTS

| | | |
|---|---|---|
| CN | 101173869 A | 5/2008 |
| CN | 102188860 A | 9/2011 |
| CN | 103403463 A | 11/2013 |
| CN | 103597292 A | 2/2014 |
| EP | 0971321 A2 | 1/2000 |
| JP | H0972596 A | 3/1997 |
| JP | 2004063993 A | 2/2004 |
| WO | WO-2012118550 A1 | 9/2012 |

OTHER PUBLICATIONS

"Statistical Methods in Water Resources," by D.R. Helsel and R.M. Hirsch, Sep. 2002, Chapter 12 Trend Analysis, printed from <http://pubs.usgs.gov/twri/twri4a3/pdf/chapter12.pdf> on May 31, 2015.
International Search Report regarding International Application No. PCT/US2015/030854, dated Aug. 25, 2015.
Written Opinion of the International Searching Authority regarding International Application No. PCT/US2015/030854, dated Aug. 25, 2015.
Office Action regarding Canadian Patent Application No. 2,948,193, dated Sep. 28, 2017.
European Search Report regarding European Application No. 15792815. 1, dated Dec. 12, 2017.
Examination Report regarding Canadian Patent Application No. 2,948,193, dated Aug. 17, 2018.
First Office Action regarding Chinese Patent Application for Invention No. 201580034239.3, dated Sep. 30, 2018. Translation provided by Unitalen Attorneys at Law.

* cited by examiner

HVAC SYSTEM AIR FILTER DIAGNOSTICS AND MONITORING

CROSS-REFERENCE TO RELATED APPLICATIONS

This application claims the benefit of U.S. Provisional Application No. 61/993,552, filed on May 15, 2014. The entire disclosure of the above application is incorporated herein by reference.

FIELD

The present disclosure relates to environmental comfort systems and more particularly to remote monitoring and diagnosis of residential and light commercial environmental comfort systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, or air conditioning) system controls environmental parameters, such as temperature and humidity, of a building. The target values for the environmental parameters, such as a temperature set point, may be specified by a user, occupant, or owner of the building, such as an employee working in the building or a homeowner.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at multiple speeds or at any speed within a predetermined range. One or more switching relays (not shown) may be used to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary heat.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold, which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164. A filter-drier 154 may be located between the condenser 152 and the expansion valve 140. The filter-drier 154 removes moisture and/or other contaminants from the circulating refrigerant.

In various implementations, the control module 156 may simply include a run capacitor, a start capacitor, and a contactor or relay. In fact, in certain implementations, the start capacitor may be omitted, such as when a scroll compressor instead of a reciprocating compressor is being used. The compressor 148 may be a variable-capacity compressor and may respond to a multiple-level cool request. For example, the cool request may indicate a mid-capacity call for cool or a high-capacity call for cool.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Monitoring of operation of components in the condensing unit 164 and the air handler unit 136 has traditionally been performed by an expensive array of multiple discrete sensors that measure current individually for each component. For example, a first sensor may sense the current drawn by a motor, another sensor measures resistance or current flow of an igniter, and yet another sensor monitors a state of a gas valve. However, the cost of these sensors and the time required for installation of, and taking readings from, the sensors has made monitoring cost-prohibitive.

With specific reference to the filter 104, homeowners or occupants have traditionally used a schedule based system to replace the filter 104 of the HVAC system and/or a thermostat run-time based filter alert system. For example, a homeowner or occupant may replace the filter 104 every month, every two months, every three months, etc., based on the specific filter and/or manufacturer recommendations. The traditional schedule based system, however, may not account for performance characteristics of the filter 104, varying environmental factors that could increase or decrease the life of the filter 104, and/or the homeowner missing or delaying a scheduled filter change.

SUMMARY

This section provides a general summary of the disclosure, and is not a comprehensive disclosure of its full scope or all of its features.

A monitoring system for a heating, ventilation, or air conditioning (HVAC) system of a building is provided and includes a monitoring server, located remotely from the building. The monitoring server is configured to (i) receive operating parameter data from a monitoring device at the building that measures an operating parameter of the HVAC system, (ii) generate a plurality of data clusters from the operating parameter data, each data cluster corresponding to operating parameter data generated during steady-state operation of the HVAC system, (iii) calculate an average operating parameter value for each data cluster, (iv) calculate normalized operating parameter values based on normalizing the average operating parameter values for the data clusters over a predetermined normalization time period, (v) compare the normalized operating parameter values with a threshold, (vi) determine whether an air filter of the HVAC system needs to be replaced based on the comparison, and (vii) generate a notification based on the determination indicating that the air filter needs to be replaced.

A method of monitoring a heating, ventilation, and air conditioning (HVAC) system of a building is provided and includes receiving, with a monitoring server located remotely from the building, operating parameter data from a monitoring device at the building that measures an operating parameter of the HVAC system. The method also includes generating, with the monitoring server, a plurality of data clusters from the operating parameter data, each data cluster corresponding to operating parameter data generated during steady-state operation of the HVAC system. The method also includes calculating, with the monitoring server, an average operating parameter value for each data cluster. The method also includes calculating, with the monitoring server, normalized operating parameter values based on normalizing the average operating parameter values for the data clusters over a predetermined normalization time period. The method also includes comparing, with the monitoring server, the normalized operating parameter values with a threshold. The method also includes determining, with the monitoring server, whether an air filter of the HVAC system needs to be replaced based on the comparison. The method also includes generating, with the monitoring server, a notification based on the determining indicating that the air filter needs to be replaced.

Another monitoring system for a heating, ventilation, or air conditioning (HVAC) system of a building is provided and includes a monitoring server, located remotely from the building. The monitoring server is configured to (i) receive operating parameter data from a monitoring device at the building that measures an operating parameter of the HVAC system, (ii) generate a plurality of data clusters from the operating parameter data, each data cluster corresponding to operating parameter data generated during steady-state operation of the HVAC system, (iii) calculate an average operating parameter value for each data cluster, (iv) calculate normalized operating parameter values based on normalizing the average operating parameter values for the data clusters over a predetermined normalization time period, (v) performing a trend analysis of the normalized operating parameter values by comparing each normalized operating parameter value with previous normalized operating parameter values, determining a trend for the normalized operating parameter values associated with each normalized operating parameter value, and associating a trend confidence level with each normalized operating parameter value, (vi) determine whether an air filter of the HVAC system needs to be replaced based on the trend analysis, and (vii) generate a notification based on the determination indicating that the air filter needs to be replaced.

Another method of monitoring a heating, ventilation, or air conditioning (HVAC) system of a building is provided and includes receiving, with a monitoring server located remotely from the building, operating parameter data from a monitoring device at the building that measures an operating parameter of the HVAC system. The method also includes generating, with the monitoring server, a plurality of data clusters from the operating parameter data, each data cluster corresponding to operating parameter data generated during steady-state operation of the HVAC system. The method also includes calculating, with the monitoring server, an average operating parameter value for each data cluster. The method also includes calculating, with the monitoring server, normalized operating parameter values based on normalizing the average operating parameter values for the data clusters over a predetermined normalization time period. The method also includes performing, with the monitoring server, a trend analysis of the normalized operating parameter values by comparing each normalized operating parameter value with previous normalized operating parameter values, determining a trend for the normalized operating parameter values associated with each normalized operating parameter value, and associating a trend confidence level with each normalized operating parameter value. The method also includes determining, with the monitoring server, whether an air filter of the HVAC system needs to be replaced based on the trend analysis. The method also includes generating, with the monitoring server, a notification based on the determination indicating that the air filter needs to be replaced.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

According to the present disclosure, a monitoring system can be integrated with a residential or light commercial HVAC (heating, ventilation, or air conditioning) system of a building. The monitoring system can provide information on the status, maintenance, and efficiency of the HVAC system to customers and/or contractors associated with the building. For example, the building may be a single-family residence, and the customer may be the homeowner, a landlord, or a tenant. In other implementations, the building may be a light commercial building, and the customer may be the building owner, a tenant, or a property management company.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, and air conditioners. HVAC systems as described in this application do not necessarily include both heating and air conditioning, and may instead have only one or the other.

In split HVAC systems with an air handler unit (often, located indoors) and a condensing unit (often, located outdoors), an air handler monitor module and a condensing monitor module, respectively, can be used. The air handler monitor module and the condensing monitor module may be integrated by the manufacturer of the HVAC system, may be added at the time of the installation of the HVAC system, and/or may be retrofitted to an existing HVAC system.

Figure 1:
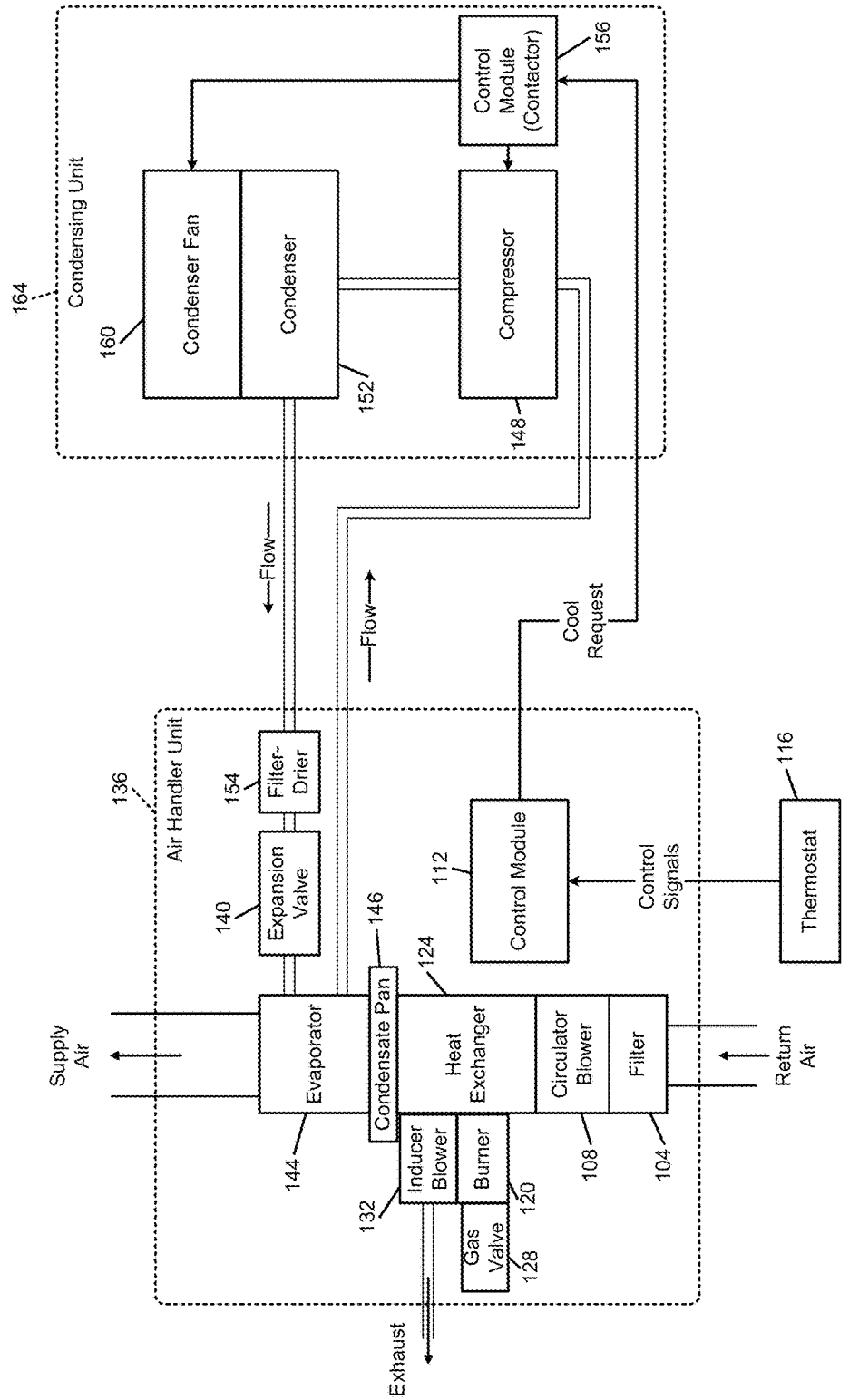
FIG. 1 is a block diagram of an example HVAC system according to the prior art.

In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building. When the flow of refrigerant is reversed, the roles of the evaporator and condenser are reversed—i.e., refrigerant evaporation occurs in what is labeled the condenser while refrigerant condensation occurs in what is labeled as the evaporator.

The air handler monitor and condensing monitor modules monitor operating parameters of associated components of the HVAC system. For example, the operating parameters may include power supply current, power supply voltage, operating and ambient temperatures of inside and outside air, refrigerant temperatures at various points in the refrigerant loop, fault signals, control signals, and humidity of inside and outside air.

The principles of the present disclosure may be applied to monitoring other systems, such as a hot water heater, a boiler heating system, a refrigerator, a refrigeration case, a pool heater, a pool pump/filter, etc. As an example, the hot water heater may include an igniter, a gas valve (which may be operated by a solenoid), an igniter, an inducer blower, and a pump. The monitoring system may analyze aggregate current readings to assess operation of the individual components of the hot water heater.

The air handler monitor and condensing monitor modules may communicate data between each other, while one or both of the air handler monitor and condensing monitor modules upload data to a remote location. The remote location may be accessible via any suitable network, including the Internet.

The remote location includes one or more computers, which will be referred to as servers. The servers execute a monitoring system on behalf of a monitoring company. The monitoring system receives and processes the data from the air handler monitor and condensing monitor modules of customers who have such systems installed. The monitoring system can provide performance information, diagnostic alerts, and error messages to a customer and/or third parties, such as designated HVAC contractors.

A server of the monitoring system includes a processor and memory. The memory stores application code that processes data received from the air handler monitor and condensing monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from the air handler monitor and condensing monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues affecting effectiveness or efficiency of the HVAC system, and may receive notifications related to routine maintenance. The methods of notification may take the form of push or pull updates to an application, which may be executed on a smart phone or other mobile device or on a standard computer. Notifications may also be viewed using web applications or on local displays, such as on a thermostat or other displays located throughout the building or on a display (not shown) implemented in the air handler monitor module or the condensing monitor module. Notifications may also include text messages, emails, social networking messages, voicemails, phone calls, etc.

The air handler monitor and condensing monitor modules may each sense an aggregate current for the respective unit without measuring individual currents of individual components. The aggregate current data may be processed using frequency domain analysis, statistical analysis, and state machine analysis to determine operation of individual components based on the aggregate current data. This processing may happen partially or entirely in a server environment, remote from the customer's building or residence.

The frequency domain analysis may allow individual contributions of HVAC system components to be determined. For example only, individual current contribution of a circulator blower motor within the HVAC system may be determined by the monitoring system. Some of the advantages of using an aggregate current measurement may include reducing the number of current sensors that would otherwise be necessary to monitor each of the HVAC system components. This reduces bill of materials costs, as well as installation costs and potential installation problems. Further, providing a single time-domain current stream may reduce the amount of bandwidth necessary to upload the current data. Nevertheless, the present disclosure could also be used with additional current sensors.

Based on measurements from the air handler monitor and condensing monitor modules, the monitoring company can determine whether HVAC components are operating at their peak performance and can advise the customer and the contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. The contractor can also be notified that a service call will be required. Depending on the contractual relationship between the customer and the contractor, the contractor may immediately schedule a service call to the building.

The monitoring system may provide specific information to the contractor, including identifying information of the customer's HVAC system, including make and model numbers, as well as indications of the specific part numbers that appear to be failing. Based on this information, the contractor can allocate the correct repair personnel that have experience with the specific HVAC system and/or component. In addition, the service technician is able to bring replacement parts, avoiding return trips after diagnosis.

Depending on the severity of the failure, the customer and/or contractor may be advised of relevant factors in determining whether to repair the HVAC system or replace some or all of the components of the HVAC system. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of the HVAC system. For example, failure of heat in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment upon installation and/or applying surcharges to repairs and service visits.

For the air handler monitor and condensing monitor modules, the monitoring company or contractor may charge the customer the equipment cost, including the installation cost, at the time of installation and/or may recoup these costs as part of the monthly fee. Alternatively, rental fees may be charged for the air handler monitor and condensing monitor modules, and once the monitoring service is stopped, the air handler monitor and condensing monitor modules may be returned.

The monitoring service may allow the customer and/or contractor to remotely monitor and/or control HVAC components, such as setting temperature, enabling or disabling heating and/or cooling, etc. In addition, the customer may be able to track energy usage, cycling times of the HVAC system, and/or historical data. Efficiency and/or operating costs of the customer's HVAC system may be compared against HVAC systems of neighbors, whose buildings will be subject to the same or similar environmental conditions. This allows for direct comparison of HVAC system and overall building efficiency because environmental variables, such as temperature and wind, are controlled.

The installer can provide information to the remote monitoring system including identification of control lines that were connected to the air handler monitor module and condensing monitor module. In addition, information such as the HVAC system type, year installed, manufacturer, model number, BTU rating, filter type, filter size, tonnage, etc.

In addition, because the condensing unit may have been installed separately from the furnace, the installer may also record and provide to the remote monitoring system the manufacturer and model number of the condensing unit, the year installed, the refrigerant type, the tonnage, etc. Upon installation, baseline tests are run. For example, this may include running a heating cycle and a cooling cycle, which the remote monitoring system records and uses to identify initial efficiency metrics. Further, baseline profiles for current, power, and frequency domain current can be established.

The server may store baseline data for the HVAC system of each building. The baselines can be used to detect changes indicating impending or existing failures. For example only, frequency-domain current signatures of failures of various components may be pre-programmed, and may be updated based on observed evidence from contractors. For example, once a malfunction in an HVAC system is recognized, the monitoring system may note the frequency data leading up to the malfunction and correlate that frequency signature with frequency signatures associated with potential causes of the malfunction. For example only, a computer learning system, such as a neural network or a genetic algorithm, may be used to refine frequency signatures. The frequency signatures may be unique to different types of HVAC systems but may share common characteristics. These common characteristics may be adapted based on the specific type of HVAC system being monitored.

The installer may collect a device fee, an installation fee, and/or a subscription fee from the customer. In various implementations, the subscription fee, the installation fee, and the device fee may be rolled into a single system fee, which the customer pays upon installation. The system fee may include the subscription fee for a set number of years, such as 1, 2, 5, or 10, or may be a lifetime subscription, which may last for the life of the home or the ownership of the building by the customer.

The monitoring system can be used by the contractor during and after installation and during and after repair (i) to verify operation of the air handler monitor and condensing monitor modules, as well as (ii) to verify correct installation of the components of the HVAC system. In addition, the customer may review this data in the monitoring system for assurance that the contractor correctly installed and configured the HVAC system. In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

The historical data collected by the monitoring system may allow the contractor to properly specify new HVAC components and to better tune configuration, including dampers and set points of the HVAC system. The information collected may be helpful in product development and assessing failure modes. The information may be relevant to warranty concerns, such as determining whether a particular problem is covered by a warranty. Further, the information may help to identify conditions, such as unauthorized system modifications, that could potentially void warranty coverage.

Original equipment manufacturers may subsidize partially or fully the cost of the monitoring system and air handler and condensing monitor modules in return for access to this information. Installation and service contractors may also subsidize some or all of these costs in return for access to this information, and for example, in exchange for being recommended by the monitoring system. Based on historical service data and customer feedback, the monitoring system may provide contractor recommendations to customers.

Figure 2A:
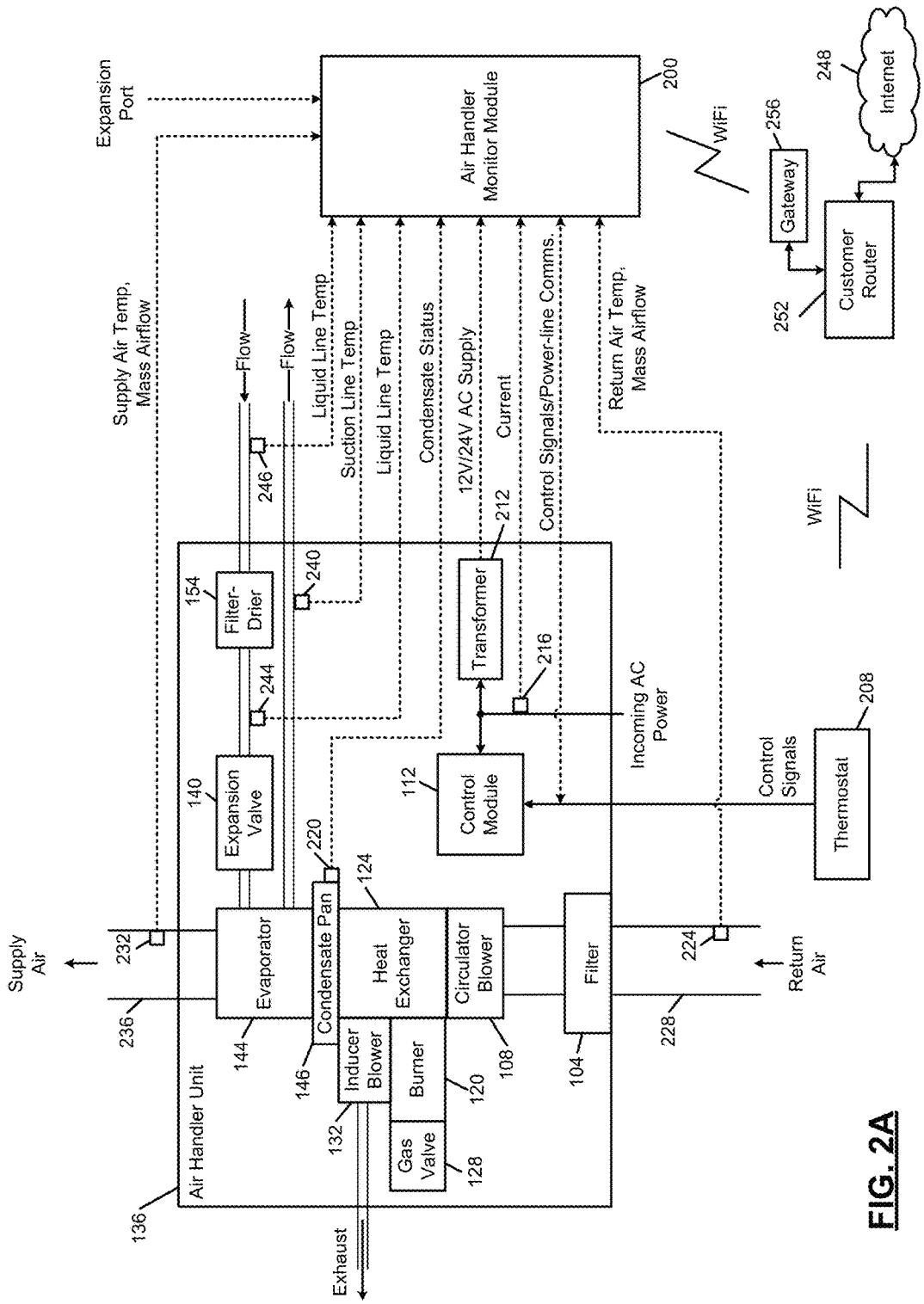
FIG. 2A is a functional block diagram of an example HVAC system including an implementation of an air handler monitor module.
Figure 2B:
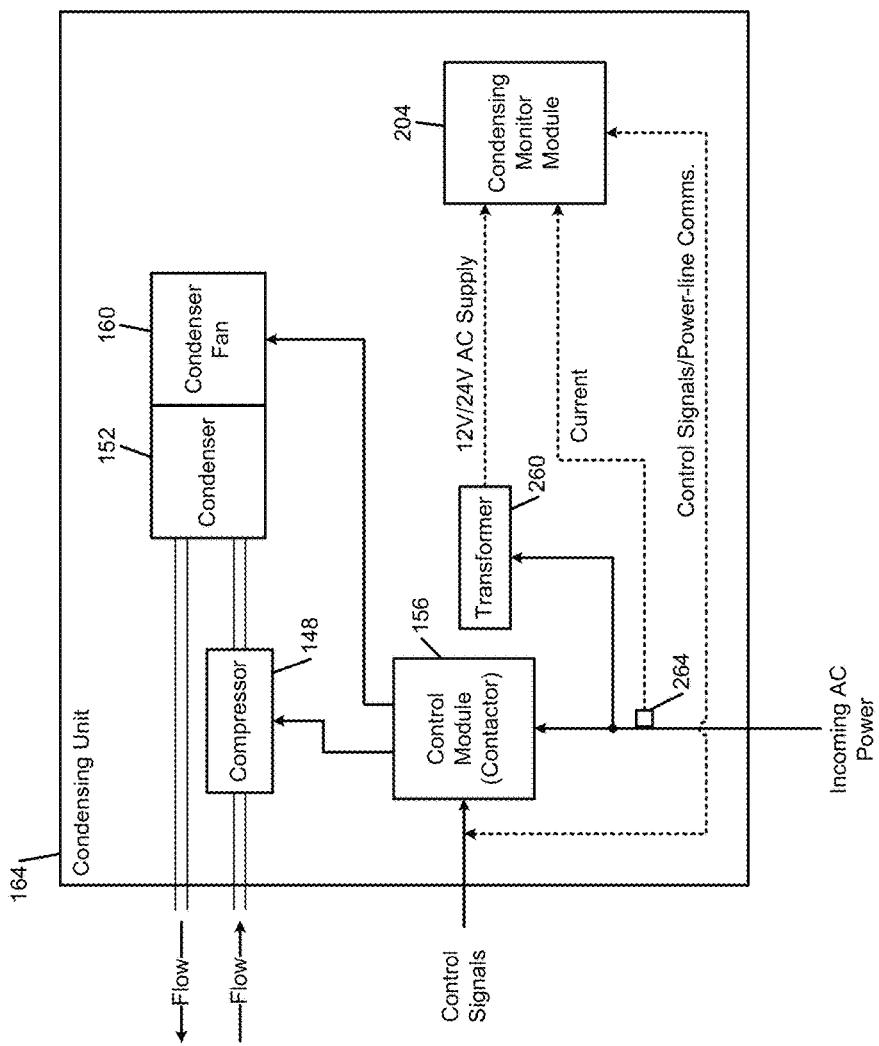
FIG. 2B is a functional block diagram of an example HVAC system including an implementation of a condensing monitor module.

FIGS. 2A-2B are functional block diagrams of an example monitoring system associated with an HVAC system of a building. The air handler unit 136 of FIG. 1 is shown for reference. Because the monitoring systems of the present disclosure can be used in retrofit applications, elements of the air handler unit 136 may remain unmodified. An air handler monitor module 200 and a condensing monitor module 204 can be installed in an existing system without needing to replace the original thermostat 116 shown in FIG. 1. To enable certain additional functionality, however, such as WiFi thermostat control and/or thermostat display of alert messages, the thermostat 116 of FIG. 1 may be replaced with a thermostat 208 having networking capability.

In many systems, the air handler unit 136 is located inside the building, while the condensing unit 164 is located outside the building. The present disclosure is not limited, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, the air handler monitor module 200 is shown external to the air handler unit 136, although the air handler monitor module 200 may be physically located outside of, in contact with, or even inside of an enclosure, such as a sheet metal casing, of the air handler unit 136.

When installing the air handler monitor module 200 in the air handler unit 136, power is provided to the air handler monitor module 200. For example, a transformer 212 can be connected to an AC line in order to provide AC power to the air handler monitor module 200. The air handler monitor module 200 may measure voltage of the incoming AC line based on this transformed power supply. For example, the transformer 212 may be a 10-to-1 transformer and therefore provide either a 12V or 24V AC supply to the air handler monitor module 200 depending on whether the air handler unit 136 is operating on nominal 120 volt or nominal 240 volt power. The air handler monitor module 200 then receives power from the transformer 212 and determines the AC line voltage based on the power received from the transformer 212.

For example, frequency, amplitude, RMS voltage, and DC offset may be calculated based on the measured voltages. In situations where 3-phase power is used, the order of the phases may be determined. Information about when the voltage crosses zero may be used to synchronize various measurements and to determine frequency of the AC power based on counting the number of zero crossings within a predetermine time period.

A current sensor 216 measures incoming current to the air handler unit 136. The current sensor 216 may include a current transformer that snaps around one power lead of the incoming AC power. The current sensor 216 may alternatively include a current shunt or a Hall Effect device. In various implementations, a power sensor (not shown) may be used in addition to or in place of the current sensor 216.

In various other implementations, electrical parameters (such as voltage, current, and power factor) may be measured at a different location, such as at an electrical panel providing power to the building from the electrical utility.

For simplicity of illustration, the control module 112 is not shown to be connected to the various components and sensors of the air handler unit 136. In addition, routing of the AC power to various powered components of the air handler unit 136, such as the circulator blower 108, the gas valve 128, and the inducer blower 132, are also not shown for simplicity. The current sensor 216 measures the current entering the air handler unit 136 and therefore represents an aggregate current of the current-consuming components of the air handler unit 136.

The aggregate current includes current drawn by all energy-consuming components of the air handler unit 136. For example only, the energy-consuming components can include a gas valve solenoid, an igniter, a circulator blower motor, an inducer blower motor, a secondary heat source, an expansion valve controller, a furnace control panel, a condensate pump, and a transformer, which may provide power to a thermostat. The energy-consuming components may also include the air handler monitor module 200 itself and the condensing monitor module 204.

It may be difficult to isolate the current drawn by any individual energy-consuming component. Further, it may be difficult to quantify or remove distortion in the aggregate current, such as distortion that may be caused by fluctuations of the voltage level of incoming AC power. As a result, processing is applied to the current, which includes, for example only, filtering, statistical processing, and frequency domain processing.

The control module 112 controls operation in response to signals from a thermostat 208 received over control lines. The air handler monitor module 200 monitors the control lines. The control lines may include a call for cool, a call for heat, and a call for fan. The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

The control lines may be monitored by attaching leads to terminal blocks at the control module 112 at which the fan and heat signals are received. These terminal blocks may include additional connections where leads can be attached between these additional connections and the air handler monitor module 200. Alternatively, leads from the air handler monitor module 200 may be attached to the same location as the fan and heat signals, such as by putting multiple spade lugs underneath a signal screw head.

In various implementations, the cool signal from the thermostat 208 may be disconnected from the control module 112 and attached to the air handler monitor module 200. The air handler monitor module 200 can then provide a switched cool signal to the control module 112. This allows the air handler monitor module 200 to interrupt operation of the air conditioning system, such as upon detection of water by one of the water sensors. The air handler monitor module 200 may also interrupt operation of the air conditioning system based on information from the condensing monitor module 204, such as detection of a locked rotor condition in the compressor.

A condensate sensor 220 measures condensate levels in the condensate pan 146. If a level of condensate gets too high, this may indicate a plug or clog in the condensate pan 146 or a problem with hoses or pumps used for drainage from the condensate pan 146. The condensate sensor 220 may be installed along with the air handler monitor module 200 or may already be present. When the condensate sensor 220 is already present, an electrical interface adapter may be used to allow the air handler monitor module 200 to receive the readings from the condensate sensor 220. Although shown in FIG. 2A as being internal to the air handler unit 136, access to the condensate pan 146, and therefore the location of the condensate sensor 220, may be external to the air handler unit 136.

Additional water sensors, such as a conduction (wet floor) sensor may also be installed. The air handler unit 136 may be located on a catch pan, especially in situations where the air handler unit 136 is located above living space of the building. The catch pan may include a float switch. When enough liquid accumulates in the catch pan, the float switch provides an over-level signal, which may be sensed by the air handler monitor module 200.

A return air sensor 224 is located in a return air plenum 228. The return air sensor 224 may measure temperature and may also measure mass airflow. In various implementations, a thermistor may be multiplexed as both a temperature sensor and a hot wire mass airflow sensor. In various implementations, the return air sensor 224 is upstream of the filter 104 but downstream of any bends in the return air plenum 228.

A supply air sensor 232 is located in a supply air plenum 236. The supply air sensor 232 may measure air temperature and may also measure mass airflow. The supply air sensor 232 may include a thermistor that is multiplexed to measure both temperature and, as a hot wire sensor, mass airflow. In various implementations, such as is shown in FIG. 2A, the supply air sensor 232 may be located downstream of the evaporator 144 but upstream of any bends in the supply air plenum 236.

A differential pressure reading may be obtained by placing opposite sensing inputs of a differential pressure sensor (not shown) in the return air plenum 228 and the supply air plenum 236, respectively. For example only, these sensing inputs may be collocated or integrated with the return air sensor 224 and the supply air sensor 232, respectively. In various implementations, discrete pressure sensors may be placed in the return air plenum 228 and the supply air plenum 236. A differential pressure value can then be calculated by subtracting the individual pressure values.

The air handler monitor module 200 also receives a suction line temperature from a suction line temperature sensor 240. The suction line temperature sensor 240 measures refrigerant temperature in the refrigerant line between the evaporator 144 of FIG. 2A and the compressor 148 of FIG. 2B.

A liquid line temperature sensor 244 measures the temperature of refrigerant in a liquid line traveling from the condenser 152 of FIG. 2B to the expansion valve 140. When the filter-drier 154 is present, the liquid line temperature sensor 244 may be located between the filter-drier 154 and the expansion valve 140. In addition, a second liquid line temperature sensor 246 may be located in the refrigerant line prior to (i.e., upstream with respect to refrigerant flow) the filter-drier 154.

The air handler monitor module 200 may include one or more expansion ports to allow for connection of additional sensors and/or to allow connection to other devices, such as a home security system, a proprietary handheld device for use by contractors, or a portable computer.

The air handler monitor module 200 also monitors control signals from the thermostat 208. Because one or more of these control signals is also transmitted to the condensing unit 164 (shown in FIG. 2B), these control signals can be used for communication between the air handler monitor module 200 and the condensing monitor module 204 (shown in FIG. 2B).

The air handler monitor module 200 may transmit frames of data corresponding to periods of time. For example only, 7.5 frames may span one second (i.e., 0.1333 seconds per frame). Each frame of data may include voltage, current, temperatures, control line status, and water sensor status. Calculations may be performed for each frame of data, including averages, powers, RMS, and fast Fourier transform (FFT). The frame is then transmitted to the monitoring system.

The voltage and current signals may be sampled by an analog-to-digital converter at a certain rate, such as 1920 samples per second. The frame length may be measured in terms of samples. When a frame is 256 samples long, at a sample rate of 1920 samples per second, there will be 7.5 frames per second.

The sampling rate of 1920 Hz has a Nyquist frequency of 960 Hz and therefore allows an FFT bandwidth of up to approximately 960 Hz. An FFT limited to the time span of a single frame may be calculated for each frame. Then, for that frame, instead of transmitting all of the raw current data, only statistical data (such as average current) and frequency-domain data are transmitted.

This gives the monitoring system current data having a 7.5 Hz resolution, and gives frequency-domain data with approximately the 960 Hz bandwidth. The time-domain current and/or the derivative of the time-domain current may be analyzed to detect impending or existing failures. In addition, the current and/or the derivative may be used to determine which set of frequency-domain data to analyze. For example, certain time-domain data may indicate the approximate window of activation of a hot surface igniter, while frequency-domain data is used to assess the state of repair of the hot surface igniter.

In various implementations, the air handler monitor module 200 may only transmit frames during certain periods of time. These periods may be critical to operation of the HVAC system. For example, when thermostat control lines change, the air handler monitor module 200 may record data and transmit frames for a predetermined period of time after that transition. Then, if the HVAC system is operating, the air handler monitor module 200 may intermittently record data and transmit frames until operation of the HVAC system has completed.

The air handler monitor module 200 transmits data measured by both the air handler monitor module 200 itself and the condensing monitor module 204 over a wide area network 248, such as the Internet (referred to as the Internet 248). The air handler monitor module 200 may access the Internet 248 using a router 252 of the customer. The customer router 252 may already be present to provide Internet access to other devices (not shown) within the building, such as a customer computer and/or various other devices having Internet connectivity, such as a DVR (digital video recorder) or a video gaming system.

The air handler monitor module 200 communicates with the customer router 252 using a proprietary or standardized, wired or wireless protocol, such as Bluetooth, ZigBee (IEEE 802.15.4), 900 Megahertz, 2.4 Gigahertz, WiFi (IEEE 802.11). In various implementations, a gateway 256 is implemented, which creates a wireless network with the air handler monitor module 200. The gateway 256 may interface with the customer router 252 using a wired or wireless protocol, such as Ethernet (IEEE 802.3).

The thermostat 208 may also communicate with the customer router 252 using WiFi. Alternatively, the thermostat 208 may communicate with the customer router 252 via the gateway 256. In various implementations, the air handler monitor module 200 and the thermostat 208 do not communicate directly. However, because they are both connected through the customer router 252 to a remote monitoring system, the remote monitoring system may allow for control of one based on inputs from the other. For example, various faults identified based on information from the air handler monitor module 200 may cause the remote monitoring system to adjust temperature set points of the thermostat 208 and/or display warning or alert messages on the thermostat 208.

In various implementations, the transformer 212 may be omitted, and the air handler monitor module 200 may include a power supply that is directly powered by the incoming AC power. Further, power-line communications may be conducted over the AC power line instead of over a lower-voltage HVAC control line.

In various implementations, the current sensor 400 may be omitted, and instead a voltage sensor (not shown) may be used. The voltage sensor measures the voltage of an output of a transformer internal to the control module 112, the internal transformer providing the power (e.g., 24 Volts) for the control signals. The air handler monitor module 200 may measure the voltage of the incoming AC power and calculate a ratio of the voltage input to the internal transformer to the voltage output from the internal transformer. As the current load on the internal transformer increases, the impedance of the internal transformer causes the voltage of the output power to decrease. Therefore, the current draw from the internal transformer can be inferred from the measured ratio (also called an apparent transformer ratio). The inferred current draw may be used in place of the measured aggregate current draw described in the present disclosure.

In FIG. 2B, the condensing monitor module 204 is installed in the condensing unit 164. A transformer 260 converts incoming AC voltage into a stepped-down voltage for powering the condensing monitor module 204. In various implementations, the transformer 260 may be a 10-to-1 transformer. A current sensor 264 measures current entering the condensing unit 164. The condensing monitor module 204 may also measure voltage from the supply provided by the transformer 260. Based on measurements of the voltage and current, the condensing monitor module 204 may calculate power and/or may determine power factor.

A liquid line temperature sensor 266 measures the temperature of refrigerant traveling from the condenser 152 to the air handler unit 136. In various implementations, the liquid line temperature sensor 266 is located prior to any filter-drier, such as the filter-drier 154 of FIG. 2A. In normal operation, the liquid line temperature sensor 266 and the liquid line temperature sensor 246 of FIG. 2A may provide similar data, and therefore one of the liquid line temperature sensors 246 or 266 may be omitted. However, having both of the liquid line temperature sensors 246 and 266 may allow for certain problems to be diagnosed, such as a kink or other restriction in the refrigerant line between the air handler unit 136 and the condensing unit 164.

In various implementations, the condensing monitor module 204 may receive ambient temperature data from a temperature sensor (not shown). When the condensing monitor module 204 is located outdoors, the ambient temperature represents an outside ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on geographical location of the building may be used to determine sun load, outside ambient air temperature, precipitation, and humidity.

In various implementations, the condensing monitor module 204 may receive refrigerant temperature data from refrigerant temperature sensors (not shown) located at various points, such as before the compressor 148 (referred to as a suction line temperature), after the compressor 148 (referred to as a compressor discharge temperature), after the condenser 152 (referred to as a liquid line out temperature), and/or at one or more points along a coil of the condenser 152. The location of temperature sensors may be dictated by a physical arrangement of the condenser coils. Additionally or alternatively to the liquid line out temperature sensor, a liquid line in temperature sensor may be used. An approach temperature may be calculated, which is a measure of how close the condenser 152 has been able to bring the liquid line out temperature to the ambient air temperature.

During installation, the location of the temperature sensors may be recorded. Additionally or alternatively, a database may be maintained that specifies where temperature sensors are placed. This database may be referenced by installers and may allow for accurate remote processing of the temperature data. The database may be used for both air handler sensors and compressor/condenser sensors. The database may be prepopulated by the monitoring company or may be developed by trusted installers, and then shared with other installation contractors.

As described above, the condensing monitor module 204 may communicate with the air handler monitor module 200 over one or more control lines from the thermostat 208. In these implementations, data from the condensing monitor module 204 is transmitted to the air handler monitor module 200, which in turn uploads the data over the Internet 248.

In various implementations, the transformer 260 may be omitted, and the condensing monitor module 204 may include a power supply that is directly powered by the incoming AC power. Further, power-line communications may be conducted over the AC power line instead of over a lower-voltage HVAC control line.

Figure 2C:
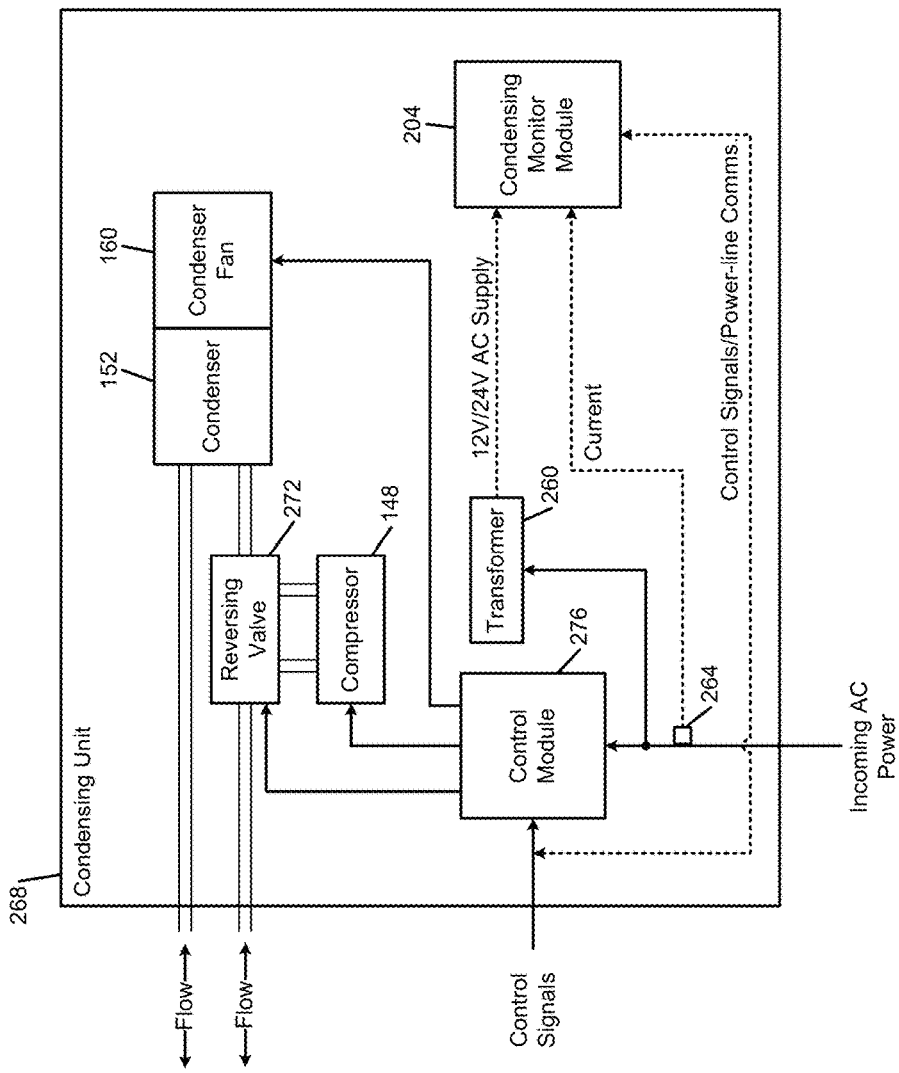
FIG. 2C is a functional block diagram of an example HVAC system based on a heat pump.

In FIG. 2C, an example condensing unit 268 is shown for a heat pump implementation. The condensing unit 268 may be configured similarly to the condensing unit 164 of FIG. 2B. Similarly to FIG. 2B, the transformer 260 may be omitted in various implementations. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode).

Figure 3A:
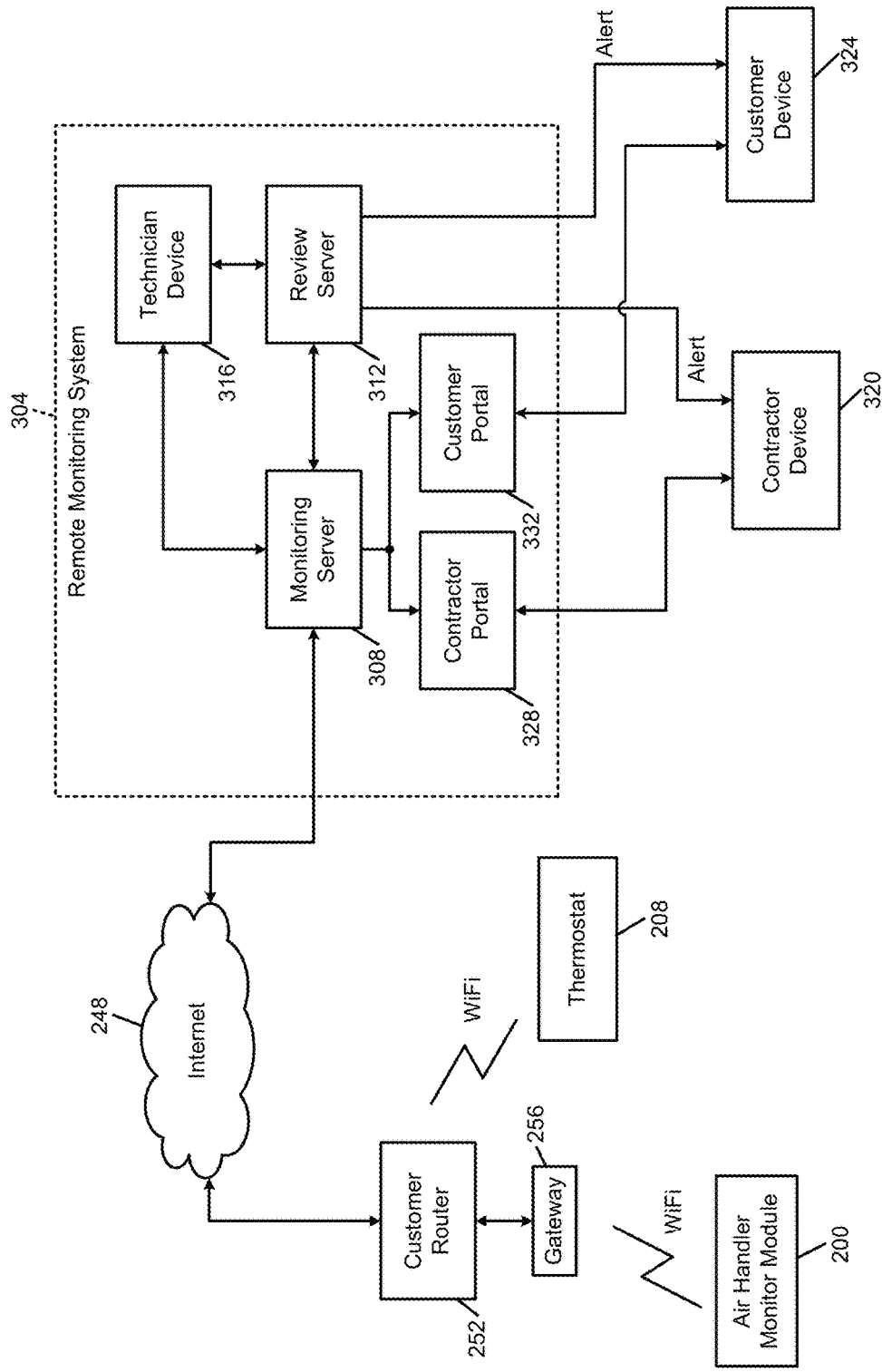
FIG. 3A is a high level functional block diagram of an example system including an implementation of a remote monitoring system.

In FIG. 3A, the air handler monitor module 200 and the thermostat 208 are shown communicating, using the customer router 252, with a remote monitoring system 304 via the Internet 248. In other implementations, the condensing monitor module 204 may transmit data from the air handler monitor module 200 and the condensing monitor module 204 to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 304 includes a monitoring server 308 that receives data from the air handler monitor module 200 and the thermostat 208 and maintains and verifies network continuity with the air handler monitor module 200. The monitoring server 308 executes various algorithms to identify problems, such as failures or decreased efficiency, and to predict impending faults.

The monitoring server 308 may notify a review server 312 when a problem is identified or a fault is predicted. This programmatic assessment may be referred to as an advisory. Some or all advisories may be triaged by a technician to reduce false positives and potentially supplement or modify data corresponding to the advisory. For example, a technician device 316 operated by a technician is used to review the advisory and to monitor data (in various implementations, in real-time) from the air handler monitor module 200 via the monitoring server 308.

The technician using the technician device 316 reviews the advisory. If the technician determines that the problem or fault is either already present or impending, the technician instructs the review server 312 to send an alert to either or both of a contractor device 320 or a customer device 324. The technician may determine that, although a problem or fault is present, the cause is more likely to be something different than specified by the automated advisory. The technician can therefore issue a different alert or modify the advisory before issuing an alert based on the advisory. The technician may also annotate the alert sent to the contractor device 320 and/or the customer device 324 with additional information that may be helpful in identifying the urgency of addressing the alert and presenting data that may be useful for diagnosis or troubleshooting.

In various implementations, minor problems may be reported to the contractor device 320 only, and not to the customer device 324, so as not to alarm the customer or inundate the customer with alerts. Whether the problem is considered to be minor may be based on a threshold. For example, an efficiency decrease greater than a predetermined threshold may be reported to both the contractor and the customer, while an efficiency decrease less than the predetermined threshold is reported to only the contractor.

In some circumstances, the technician may determine that an alert is not warranted based on the advisory. The advisory may be stored for future use, for reporting purposes, and/or for adaptive learning of advisory algorithms and thresholds. In various implementations, a majority of generated advisories may be closed by the technician without sending an alert.

Based on data collected from advisories and alerts, certain alerts may be automated. For example, analyzing data over time may indicate that whether a certain alert is sent by a technician in response to a certain advisory depends on whether a data value is on one side of a threshold or another. A heuristic can then be developed that allows those advisories to be handled automatically without technician review. Based on other data, it may be determined that certain automatic alerts had a false positive rate over a threshold. These alerts may be put back under the control of a technician.

In various implementations, the technician device 316 may be remote from the remote monitoring system 304 but connected via a wide area network. For example only, the technician device 316 may include a computing device such as a laptop, desktop, or tablet.

With the contractor device 320, the contractor can access a contractor portal 328, which provides historical and real-time data from the air handler monitor module 200. The contractor using the contractor device 320 may also contact the technician using the technician device 316. The customer using the customer device 324 may access a customer portal 332 in which a graphical view of the system status as well as alert information is shown. The contractor portal 328 and the customer portal 332 may be implemented in a variety of ways according to the present disclosure, including as an interactive web page, a computer application, and/or an app for a smartphone or tablet.

In various implementations, data shown by the customer portal may be more limited and/or more delayed when compared to data visible in the contractor portal 328. In various implementations, the contractor device 320 can be used to request data from the air handler monitor module 200, such as when commissioning a new installation.

Figure 3B:
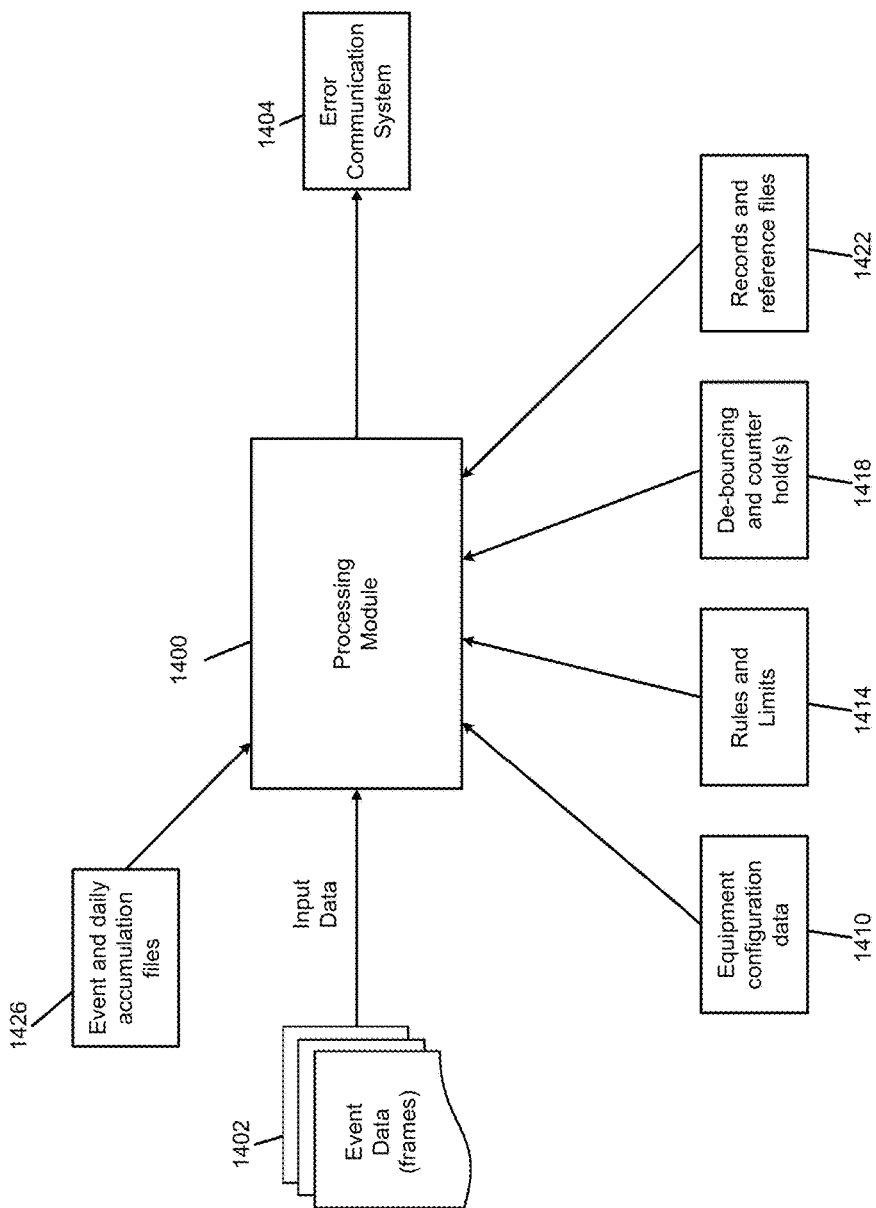
FIG. 3B is a functional block diagram of an example implementation for cloud processing of captured data.

In FIG. 3B, an example representation of cloud processing is shown. In some implementations, the monitoring server 308 includes a processing module 1400. The processing module 1400 receives event data 1402 in the form of frames. The processing module 1400 uses various input data for detection and prediction of faults. Identified faults are passed to an error communication system 1404. The event data 1402 may be stored upon receipt, for example, from the air handler monitor module 200 and/or the condensing monitor module 204.

The processing module 1400 may then perform each prediction or detection task with relevant data from the event data 1402. In various implementations, certain processing operations are common to more than one detection or prediction operation. This data may therefore be cached and reused. The processing module 1400 receives information about equipment configuration 1410, such as control signal mapping.

The processing module 1400 receives rules and limits 1414. The rules and limits 1414 determine whether sensor values are out of bounds, which may indicate sensor failures. In addition, the rules and limits 1414 may indicate that sensor values cannot be trusted when parameters such as current and voltage are outside of predetermined limits. For example only, if the AC voltage sags, such as during a brownout, data taken during that time may be discarded as unreliable.

In one implementation, de-bouncing and counter holds 1418 may store rolling averages of current, voltage, and temperature. In another implementation, de-bouncing and counter holds 1418 may store counts of anomaly detection. For example only, detection of a single solenoid-operated gas valve malfunction may increment a counter, but not trigger a fault. Only if multiple solenoid-operated gas valve failures are detected is an error signaled. This can eliminate false positives. For example only, a single failure of an energy-consuming component may cause a corresponding counter to be incremented by one, while detection of proper operation may lead to the corresponding counter being decremented by one. In this way, if faulty operation is prevalent, the counter will eventually increase to a point where an error is signaled. Records and reference files 1422 may store frequency and time domain data establishing baselines for detection and prediction. De-bouncing encompasses an averaging process that may remove glitches and/or noise. For example, a moving or windowed average may be applied to input signals to avoid spurious detection of a transition when in fact only a spike or glitch of noise was present.

A basic failure-to-function fault may be determined by comparing a control line state against an operational state based on current and/or power. Basic function may be verified by temperature and improper operation may contribute to a counter being incremented. This analysis may rely on return air temperature, supply air temperature, liquid line in temperature, voltage, current, real power, control line status, compressor discharge temperature, liquid line out temperature, and ambient temperature.

Sensor error faults may be detected by checking sensor values for anomalous operation, such as may occur for open-circuit or short-circuit faults. The values for those determinations may be found in the rules and limits 1414. This analysis may rely on return air temperature, supply air temperature, liquid line in temperature (which may correspond to a temperature of the refrigerant line in the air handler, before or after the expansion valve), control line status, compressor discharge temperature, liquid line out temperature, and ambient temperature.

When the HVAC system is off, sensor error faults may also be diagnosed. For example, based on control lines indicating that the HVAC system has been off for an hour, processing module 1400 may check whether the compressor discharge temperature, liquid line out temperature, and ambient temperature are approximately equal. In addition, the processing module 1400 may also check that the return air temperature, the supply air temperature, and the liquid line in temperature are approximately equal.

The processing module 1400 may compare temperature readings and voltages against predetermined limits to determine voltage faults and temperature faults. These faults may cause the processing module 1400 to ignore various faults that could appear present when voltages or temperatures are outside of the predetermined limits.

The processing module 1400 may check the status of discrete sensors to determine whether specifically-detected fault conditions are present. For example only, the status of condensate, float switch, and floor sensor water sensors are checked. The water sensors may be cross-checked against operating states of the HVAC system. For example only, if the air conditioning system is not running, it would not be expected that the condensate tray would be filling with water. This may instead indicate that one of the water sensors is malfunctioning. Such a determination could initiate a service call to fix the sensor so that it can properly identify when an actual water problem is present.

Figure 4:
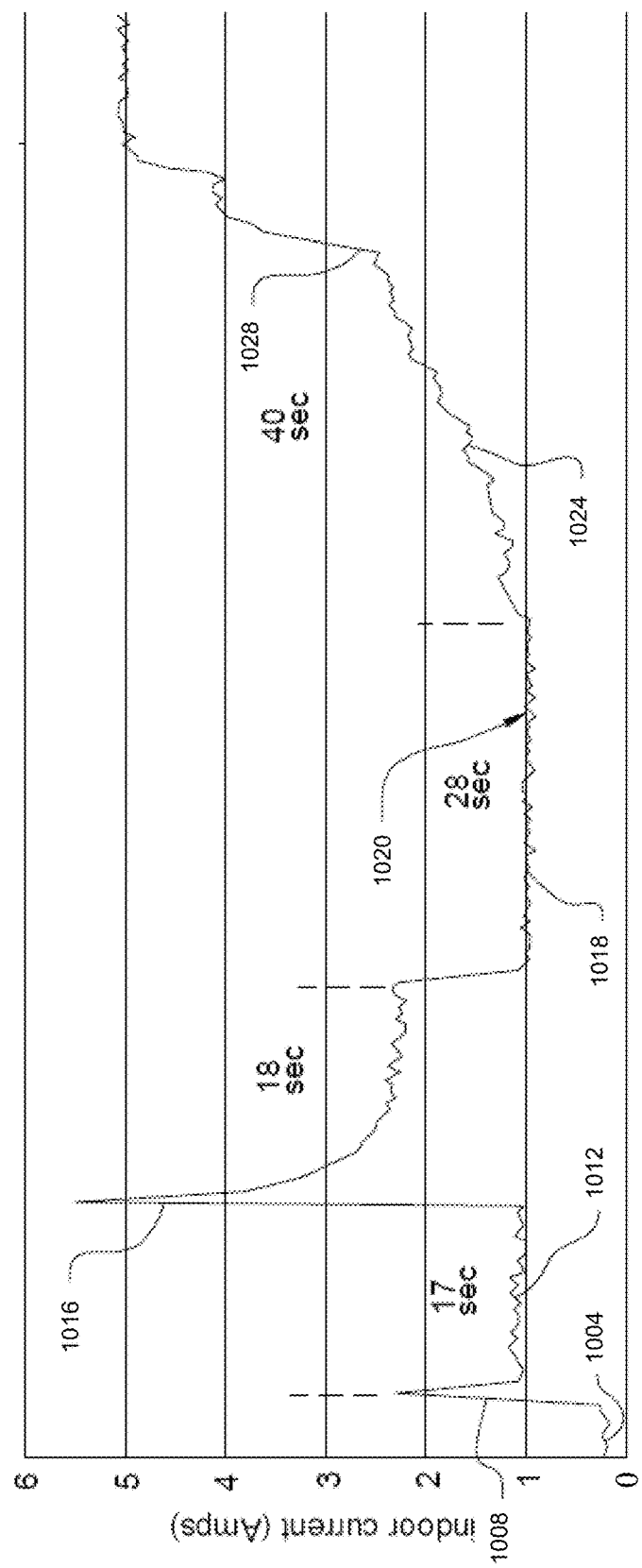
FIG. 4 is an example time domain trace of aggregate current for a beginning of a heat cycle.

The processing module 1400 may determine whether the proper sequence of furnace initiation is occurring. This may rely on event and daily accumulation files 1426. The processing module 1400 may perform state sequence decoding, such as by looking at transitions as shown in FIG. 4 and expected times during which those transitions are expected. Detected furnace sequences are compared against a reference case and errors are generated based on exceptions. The furnace sequence may be verified with temperature readings, such as observing whether, while the burner is on, the supply air temperature is increasing with respect to the return air temperature. The processing module 1400 may also use FFT processing to determine that the sparker or igniter operation and solenoid-operated gas valve operation are adequate.

The processing module 1400 may determine whether a flame probe or flame sensor is accurately detecting flame. State sequence decoding may be followed by determining whether a series of furnace initiations are performed. If so, this may indicate that the flame probe is not detecting flame and the burner is therefore being shut off. The frequency of retries may increase over time when the flame probe is not operating correctly.

The processing module 1400 may evaluate heat pump performance by comparing thermal performance against power consumption and unit history. This may rely on data concerning equipment configuration 1410, including compressor maps when available.

The processing module 1400 may determine refrigerant level of the air conditioning system. For example, the processing module 1400 may analyze the frequency content of the compressor current and extract frequencies at the third, fifth, and seventh harmonics of the power line frequencies. This data may be compared, based on ambient temperature, to historical data from when the air conditioning system was known to be fully charged. Generally, as charge is lost, the surge frequency may decrease. Additional data may be used for reinforcement of a low refrigerant level determination, such as supply air temperature, return air temperature, liquid line in temperature, voltage, real power, control line status, compressor discharge temperature, and liquid line out temperature.

The processing module 1400 may alternatively determine a low refrigerant charge by monitoring deactivation of the compressor motor by a protector switch, which may indicate a low refrigerant charge condition. To prevent false positives, the processing module 1400 may ignore compressor motor deactivation that happens sooner than a predetermined delay after the compressor motor is started, as this may instead indicate another problem, such as a stuck rotor.

The processing module 1400 may determine the performance of a capacitor in the air handler unit, such as a run capacitor for the circulator blower. Based on return air temperature, supply air temperature, voltage, current, real power, control line status, and FFT data, the processing module 1400 determines the time and magnitude of the start current and checks the start current curve against a reference. In addition, steady-state current may be compared over time to see whether an increase results in a corresponding increase in the difference between the return air temperature and the supply air temperature.

Similarly, the processing module 1400 determines whether the capacitor in the compressor/condenser unit is functioning properly. Based on compressor discharge temperature, liquid line out temperature, ambient temperature, voltage, current, real power, control line status, and FFT current data, control determines a time and magnitude of start current. This start current is checked against a reference in the time and/or frequency domains. The processing module 1400 may compensate for changes in ambient temperature and in liquid line in temperature. The processing module 1400 may also verify that increases in steady-state current result in a corresponding increase in the difference between the compressor discharge temperature and the liquid line in temperature.

The processing module 1400 may calculate and accumulate energy consumption data over time. The processing module 1400 may also store temperatures on a periodic basis and at the end of heat and cool cycles. In addition, the processing module 1400 may record lengths of run times. An accumulation of run times may be used in determining the age of wear items, which may benefit from servicing, such as oiling, or preemptive replacing.

The processing module 1400 may also grade the customer's equipment. The processing module 1400 compares heat flux generated by the HVAC equipment against energy consumption. The heat flux may be indicated by return air temperature and/or indoor temperature, such as from a thermostat. The processing module 1400 may calculate the envelope of the building to determine the net flux. The processing module 1400 may compare the equipment's performance, when adjusted for building envelope, against other similar systems. Significant deviations may cause an error to be indicated.

A dirty filter may be detected in light of changes in power, current, and power factor coupled with an increase in temperature split and reduced differential pressure. The power, current, and power factor may be dependent on motor type. When a mass airflow sensor is available, the mass flow sensor may be able to directly indicate a flow restriction in systems using a permanent split capacitor motor. The processing module 1400 uses a change in current or power and the type of circulator blower motor to determine the change in load. This change in load can be used to determine whether the filter 104 is dirty.

In some implementations, the processing module 1400 performs HVAC systems filter diagnostics. The HVAC systems filter diagnostics includes monitoring changes in measured values corresponding to at least one operating parameter associated with the HVAC system. The operating parameter may include, but is not limited to, a measured indoor current of the air handler unit 136 or circulator blower 108, duct temperatures, and duct airflow. The HVAC systems filter diagnostics may include analyzing an individual operating parameter in order to determine whether a filter within the HVAC system is dirty. For example, the HVAC systems filter diagnostics may include analyzing changes in current draw of the HVAC system in order to determine whether the filter is dirty.

In other implementations, the HVAC systems filter diagnostics includes analyzing multiple operating parameters in order to determine whether the filter is dirty. For example only, the HVAC systems filter diagnostics may include analyzing a correlation between a change in current draw and a change in air flow associated with the HVAC system. For example, the analyzed operating parameter may include a correlation variable corresponding to a correlation between two measured or calculated operating parameters. More specifically, the HVAC systems filter diagnostics may include analyzing a correlation variable over time that tracks the extent to which two other system operating parameters correlate with each other. The correlations are used in combining different system operating parameters to produce the normalized trajectory with improved signal to noise ratio. For example, there is a strong correlation between indoor current and system runtime in which the indoor current level becomes either elevated or decreased over time as the HVAC system runs longer and heats up. In such case, the HVAC systems filter diagnostics may monitor a correlation variable based on the correlation between the indoor current and system runtime. Over time, as particulates gather on the filter 104 within the HVAC system, the current draw of the circulator blower 108 may increase or decrease and the correlation between indoor current level and system runtime may degrade such that the two parameters are less correlated, as compared with the level of correlation when a new or clean filter is used. As another example, the correlation between current and voltage of the air handler unit 136 or of the condensing unit 164 may be used. While specific examples are given, the correlation between other operating parameters, including, duct temperatures and duct airflow, may be used.

It is understood that while specific examples are described, the HVAC systems filter diagnostics may include analyzing any individual operating parameter or any combination of operating parameters in order to determine whether the filter is dirty.

In response to changes in measured values corresponding to an operating parameter, the processing module 1400 determines whether to generate an alert indicating to the customer that performance of the HVAC system has degraded. Further, the processing module 1400 may selectively recommend and/or instruct the customer to repair and/or replace components within the HVAC system based on the monitored changes in the operating parameter.

In one implementation, the processing module 1400 receives the aggregate operating data from the air handler monitor module 200. The operating data includes measured values corresponding to the operating parameter. The operating parameter may include current measurements, supply air temperature measurements, duck split temperature measurements, air flow measurements, pressure measurements, and any other suitable operating parameter associated with the HVAC system. For example, the operating parameter may be current corresponding to a measured current draw of the circulator blower 108. In another example, the operating parameter may be a temperature corresponding to a measured supply air temperature.

The processing module 1400 is configured to normalize data associated with the operating parameter in order to account for variability in the data introduced by components of the HVAC system. For example, the HVAC system may include components that increase customer comfort and reduce energy costs. The components may include, but are not limited to, blower motors, indoor air quality (IAQ) devices, humidifiers, and zoned system components. Each component of the HVAC system may introduce variability into the operating parameter data. For example, during operation of the HVAC system, a component within the HVAC system may operate in a plurality of operating states. The plurality of operating states may include, but is not limited to, a start-up state, a transition state, and a steady-state. Further, as described below, the component may be operable in multiple stages, resulting in additional steady-states corresponding to each of the additional stages.

In a case where the component is a motor, such as the circulator blower 108, when the circulator blower 108 is initiated, the circulator blower 108 may operate in the start-up state. When the circulator blower 108 is operating in the start-up state, the circulator blower 108 may draw a first amount of current. The circulator blower 108 may then operate in the steady-state for a period of time. When the circulator blower 108 is operating in the steady-state, the circulator blower 108 draws a second amount of current. In some implementations, the first amount of current is greater than the second amount of current. Further, the circulator blower 108 may operate in the start-up state for a relatively short period time compared to a period of time that the circulator blower 108 operates in the steady-state. In other words, when the circulator blower 108 is initiated, the circulator blower 108 may draw a relatively large amount of current for a short period of time.

In some implementations, the circulator blower 108 may operate in the transition state during periods of transition. For example, the circulator blower 108 may be a multi-stage motor. The circulator blower 108 may draw different current amounts at each stage. For example only, the circulator blower 108 may be operable in three different stages and may draw current at 1 Ampere (A), 5 A, and 8 A, respectively, during operation in each of the three different stages. The HVAC system may increase a rate at which the HVAC system cools a building in order to reach a predetermined temperature. When the HVAC system increases the rate, the circulator blower 108 may transition from a first steady-state current draw, such as 1 A, to a second steady-state current draw, such as 8 A. During the period between the first steady-state current draw and the second steady-state current draw, the motor is in the transition state. Further, the supply air temperature may transition from a first steady-state temperature to a second steady-state temperature. The supply air temperature may increase or decrease to a transition temperature in order to transition from the first steady-state temperature to the second steady-state temperature.

The circulator blower 108 may operate in a plurality of transition states. Each of the transitions states may include a corresponding current draw that varies or is similar to the first current draw and the second current draw. In other words, the circulator blower 108 may draw different amounts of current during each of the operating states. It is understood that the first amount may be less than the second amount. Further, each component may operate in a plurality of operating states. In this manner, the measured operating parameter data includes values measured during start-up states, transition states, and steady-states.

In other words, the aggregate operating data includes operating parameter values measured during the start-up states, the transition states, and the steady-states of various components of the HVAC system.

Operating parameter data corresponding to the start-up states and transition states may be referred to as non-steady-state data. For example, current draw measurements taken while the circulator blower 108 is in the start-up state and/or a transition state may vary from current draw measurements taken while the circulator blower 108 is in the steady-state mode in a manner that may skew the current draw data.

In some implementations, the processing module 1400 is configured to identify measured values corresponding to non-steady-state values within the operating parameter data. For example, the operating parameter data includes a plurality of measured operating parameter values. When the operating parameter is current draw, for example, the processing module 1400 compares each of the measured current draw values to a current threshold value. The processing module 1400 determines a measured current draw value is a non-steady-state value when the measured current draw value is greater than the current threshold value. Alternatively, the processing module 1400 may determine that a measured value corresponds to a non-steady-state value when the measured value is outside of predetermined range of values.

In another example, when the operating parameter is supply air temperature, the processing module 1400 determines a rate of change of the measured supply air temperature values. The processing module 1400 compares the rate of change to a rate of change threshold. The processing module 1400 determines the measured values associated with the rate of change are non-steady-state values when the processing module 1400 determines that the rate of change is greater than the rate of change threshold.

In this manner, the processing module 1400 identifies steady-state values of the operating parameter data by identifying non-steady-state values within the operating parameter data. In other words, any measured values within the operating parameter data that are not identified as non-steady-state values, are steady-state values.

In another implementation, the processing module 1400 identifies steady-state segments within the operating parameter data. The processing module 1400 receives the operating parameter data. The processing module 1400 is configured to perform various statistical analyses on the operating parameter data in order to identify segments of data corresponding to steady-state data. For example, the processing module 1400 is configured to perform a windowed variance analysis on the operating parameter data. The processing module 1400 identifies data samples within the operating parameter data. For example only, the operating parameter data may include measurements corresponding to the operating parameter measured over a period of one hour.

By way of non-limiting example, each second within the one hour corresponds to a data sample. In other words, operating parameter values measured during a period of one second corresponds to one sample measurement. The processing module 1400 compares samples within a window. The window may include 60 samples, 120 samples, or any suitable number of samples. For example, the window may include the first sixty consecutive samples of the operating parameter data. In other words, the window may include samples 1 through 60. The processing module 1400 determines a variance of the window. The variance indicates how far the samples within the window are spread out. For example, a small variance indicates the samples within the window are similar to each other. Conversely, a large variance indicates the samples within the window are different from each other.

The processing module 1400 determines whether the window is a steady-state segment based on a comparison of the variance to a variance threshold. When the processing module 1400 determines the variance is greater than the variance threshold, the processing module 1400 determines the window is not a steady-state segment. When the processing module 1400 determines the window is not a steady-state segment, the processing module 1400 shifts the window by one sample. In other words, the window shifts to include samples 2-61. The processing module 1400 then determines a variance for the window that includes samples 2-61.

When the processing module 1400 determines the variance is not greater than the variance threshold, the processing module 1400 determines the window is a steady-state segment. The processing module 1400 then determines a steady-state value corresponding to the window. In some implementations, the steady-state value is equal to an average value corresponding to an average of samples 1-60. The processing module 1400 stores the steady-state value.

The processing module 1400 then shifts the window to include samples 2-61. The processing module 1400 continues to determine a variance value for each window (i.e., data segments) within the operating parameter data until the processing module 1400 has analyzed each possible window within the operating parameter data. In this manner, the processing module 1400 stores a plurality of steady-state values corresponding to identified steady-state segments within the operating parameter data. The processing module 1400 may compare the samples within a window in any suitable manner besides those described herein.

The processing module 1400 may then generate data clusters based on the identified steady-state values. For example, the processing module 1400 compares the steady-state values to each other. The processing module 1400 groups steady-state values that are similar into a data cluster. For example, the processing module 1400 may determine a difference between a first steady-state value to each of the plurality of steady-state values.

The processing module 1400 compares a difference between the first steady-state value and another steady-state value to a difference threshold. When the processing module 1400 determines the difference is less than the difference threshold, the processing module 1400 determines the first steady-state value and the other steady-state value are similar. The processing module 1400 groups the first steady-state value and the other steady-state value into a first data cluster. In this manner, the processing module 1400 groups steady-state values corresponding to the same steady-state condition of the HVAC system into the same data cluster. It is understood that the processing module 1400 may identify similar steady-state values in any suitable manner besides those described herein.

The processing module 1400 may also generate a data cluster that includes a signal steady-state value. In other words, the processing module 1400 may determine that a first steady-state value is not within a range of any of the other steady-state values (i.e., the differences between the first steady-state value and every other steady-state value are greater than a difference threshold). The processing module 1400 generates a data cluster based that includes the first steady-state value.

In another example, the processing module 1400 may group the identified steady-state values with a plurality of preexisting data clusters. For example, the processing module 1400 may compare a first steady-state value with a plurality of average values corresponding to an average of each of the plurality of data clusters. The processing module 1400 determines whether the first steady-state value is within a predetermined range of one of the average data cluster values. When the processing module 1400 determines the first steady-state value is within the predetermined range of one of the average data cluster values, the processing module 1400 groups the steady-state value with the data cluster corresponding to the one of the average data cluster values. Conversely, when the processing module 1400 determines the first steady-state value is not within the predetermined range with any of the average data cluster values, the processing module 1400 generates a new data cluster that includes the first steady-state value.

In one example, the operating parameter is current draw. A first data cluster may include steady-state values corresponding to a first stage of the circulator blower 108 (i.e., when the circulator blower 108 is drawing approximately 1 A), a second data cluster may include steady-state values corresponding to a second stage of the circulator blower 108 (i.e., when the circulator blower 108 is drawing approximately 5 A), and a third data cluster may include steady-state values corresponding to the third stage of the circulator blower 108.

In another example, the operating parameter is supply air temperature. A first cluster includes steady-state values corresponding to a first supply air temperature (i.e., supply air temperature associated with a first stage of a cooling cycle) and a second data cluster includes steady-state values corresponding to a second supply air temperature (i.e., a supply air temperature associated with a second stage of a cooling cycle). It is understood that while only a limited number of data clusters are described, the operating parameter data may include any number of data clusters. Further, over a period of time (for example, 1 day) the operating parameter data may include multiple data clusters corresponding to the same and/or different steady-state over the course of the time period as the system transitions between steady-states during operation. For example, the processing module 1400 may identify a first plurality of data clusters corresponding to the first stage of the circulator blower 108 and a second plurality of data clusters corresponding to the second stage of the circulator blower 108.

In some implementations, the processing module 1400 is configured to group the data clusters. For example, the processing module 1400 groups and/or stores data clusters associated with a heating cycle together. Similarly, the processing module 1400 groups and/or stores data clusters associated with a cooling cycle together. For example, as described above, the air handler monitor module 322 monitors the control lines. The control lines may indicate an operating mode of the HVAC system. The operating mode may include a call for cool and a call for heat. The air handler monitor module 322 receives signals from the control lines indicating a current operating mode of the HVAC system. The air handle monitor module 322 stores the signals.

The air handler monitor module 322 communicates the signals to the processing module 1400. The processing module 1400 determines which data clusters correspond to the operating mode based patterns derived from the signals received from the air handler monitor module 322. For example, the processing module 1400 is configured to identify patterns of signals. The processing module 1400 is further configured to compare the identified patterns to a plurality of predefined patterns. Each of the predefined patterns corresponds to an operating mode of the HVAC system. The processing module 1400 determines which data clusters correspond to each identified pattern. The processing module 1400 then determines the operating mode corresponding to each of the data clusters. The processing module 1400 groups data clusters identified as be associated with a heating cycle together and data clusters identified as being associated with a cooling cycle together.

The processing module 1400 then generates a normalized value corresponding to each of the identified data clusters. In some implementations, the processing module 1400 determines an average value corresponding to each of the identified data clusters and the normalized value is set to the average value. In another implementation, the processing module 1400 is configured to normalize data within each of the identified data clusters. For example, the processing module 1400 is configured to execute a predetermined mathematical normalization formula in order to normalize the data within each of the identified data clusters based on a predetermined initial normalization value. In some implementations, the predetermined initial normalization value is 1. However, it is understood that the predetermined initial normalization value may be any unit-less value. The processing module 1400 identifies a first data cluster. The first data cluster may include supply air return values measured while the HVAC system was operating in the first stage of a cooling cycle. The processing module 1400 executes the normalization formula using data within the first data cluster.

The result is the normalized data value corresponding to the first data cluster. When the HVAC system is operating normally, (i.e., there are no faults within the HVAC system and the performance of the HVAC system has not degraded), the result of the formula will equal the predetermined initial normalization value. Conversely, when the HVAC system is not operating normally, (i.e., there is a fault within the HVAC system, the performance of the HVAC system has degraded, or a component within the HVAC system has been replaced), the result of the formula will equal something other than the predetermined initial normalization value. It is understood that while only mathematical averaging and normalizing are described, the processing module 1400 may perform any suitable mathematical function in order to determine a value representative of the data within an individual data cluster.

As described above, the operating parameter may include multiple steady-state stages. For example, the circulator blower 108 may be a multi-stage motor. When the operating parameter is current draw, the operating parameter data includes steady-state data corresponding to each operating stage of the circulator blower 108. In another example, the operating parameter is supply air temperature. The supply air temperature associated with the HVAC system includes multiple steady-state operating temperatures. The operating parameter data includes steady-state data corresponding to each of the steady-state operating temperatures.

The processing module 1400 is configured to normalize across multiple different data clusters corresponding to the multiple steady state stages and to generate a combined normalized data value for the multiple steady-state stages of the operating parameter. For example, when the operating parameter is current draw, the processing module 1400 identifies a plurality of current draw data clusters over a predetermined period. The period may be 1 day. The processing module 1400 executes the normalization formula using the data from each data clusters.

In an example where the circulator blower 108 is a three-stage motor, the processing module 1400 generates normalized values the data clusters corresponding to each of the three steady-state stages. In one example, the normalized value of each data cluster is an average of the data cluster. In another example, the normalized value is a result of the normalization formula described above. The processing module 1400 then executes the normalization formula using the three normalized values. The result is a combined normalized current draw value. In this manner, the processing module 1400 generates a single normalized value that corresponds to the current draw measured over the predetermined period. The processing module 1400 stores the normalized values in memory associated with the processing module 1400. The processing module 1400 may analyze the normalized values in order to monitor a performance of the HVAC system, as described below in greater detail.

In one implementation, the processing module 1400 determines a degraded performance of the filter 104 based on a trajectory analysis of operating parameter data. For example, the operating parameter data may include current draw associated with the circulator blower 108. The circulator blower 108 may be an electrically commutated motor (ECM). In other implementations, the circulator blower 108 may be a permanent split capacitor (PSC) motor. The processing module 1400 is configured to determine a motor type of the circulator blower 108.

For example only, the processing module 1400 analyzes a plurality of normalized current draw values over a predetermined period of time. The predetermined period of time may be an hour, a day, a week, a month, or any suitable period of time beginning after the HVAC system is installed. The processing module 1400 determines a motor type of the circulator blower 108 based on a trend of the motor current draw over the predetermined period. For example only, the processing module 1400 determines the circulator blower 108 comprises a constant torque ECM motor when the processing module 1400 determines the trend of the motor current draw is increasing over the period. Similarly, the processing module 1400 determines the circulator blower 108 comprises a PSC motor when the processing module 1400 determines the trend of the motor current draw is decreasing over the period.

Additionally or alternatively, the motor type of the circulator blower 108 may be known or programmed into the processing module 1400 or stored in a look-up table in a memory accessible to the processing module 1400.

Using current draw as an example of the measured operating parameter value, depending on the motor type, the processing module 1400 monitors an increase in current draw over the period or a decrease in current draw over the period. For example, when the circulator blower 108 is an ECM motor, as the filter 104 becomes dirty, the processing module 1400 monitors a change indicating an increase in current draw over a period of time.

Conversely, when the circulator blower 108 is a PSC motor, as the filter 104 becomes dirty, the processing module 1400 monitors a decrease in current draw over a period of time. While the example embodiments of the present disclosure are described in the context of the circulator blower 108 comprising either a PSC motor or an ECM motor, the principles of the present disclosure apply equally to example embodiments wherein the circulator blower 108 comprises any other suitable motor type.

In addition, while an example embodiment may be described herein in the context of monitoring an increase in current draw of an ECM motor by determining, for example, whether the current draw is greater than a predetermined threshold, it is understood that the same techniques apply to monitoring a decrease in current draw of a PSC motor by determining, for example, whether the current draw is less than a predetermined threshold.

In some implementations, the processing module 1400 is configured to compare the normalized data values to a predetermined operating parameter baseline. The operating parameter baseline may be predetermined prior to installation of the HVAC system based on the type and characteristics of various components of the HVAC system. For example only, the operating parameter baseline may be a baseline current draw corresponding to an expected current draw of the circulator blower 108. In the example implementation, the circulator blower 108, when operating as designed, i.e., is not faulty or defective, has an expected current draw, or baseline current draw. In other words, when the circulator blower 108 is operating as the circulator blower 108 is designed to operate, the circulator blower 108 is expected to draw the baseline current draw.

In another implementation, the processing module 1400 may learn an operating parameter baseline based on trajectory analysis of the operating parameter data taken over time. For example, the processing module 1400 generates normalized data values corresponding to the measured current draw of the circulator blower 108 over time. The processing module 1400 is configured to analyze normalized data values over a predetermined period in order to determine an average motor current draw. In one example, when the HVAC system is initially installed, the processing module 1400 may receive a baseline current draw associated with the circulator blower 108 based on the type, make, model, and installation of the circulator blower 108 within the HVAC system. The processing module 1400 may be configured to maintain this received value as the baseline current draw during an initial time period, such as the first month that the HVAC system is in operation. The processing module 1400 may set an initial baseline current draw equal to the average motor current draw over the initial time period.

In this manner, the processing module 1400 may determine an operating parameter baseline based on an actual performance rather than a predetermined expected performance. It is understood that the processing module 1400 may determine the initial operating parameter baseline in response to a trend analysis of measured data over any period of time, including but not limited to, a day, a week, a month, a year, and so on.

Further, while analyzing the HVAC system over a first time period, such as in the first month of operation, is described, the processing module 1400 may be configured to periodically re-establish the operating parameter baseline. In some implementations, the processing module 1400 may annually compare a trend analysis of measured data to a baseline and adjust the baseline in response to the comparison. In this manner, the processing module 1400 may account for normal degradation of the HVAC component and/or system over time.

However, many factors may result in the normalized data values being more or less than the operating parameter baseline. In one example, as particulates gather on the filter 104 within the HVAC system, the current draw of the circulator blower 108 may increase in the case of an ECM motor and decrease in the case of a PSC motor. It is understood that while only a degraded air filter is described, the circulator blower 108 may vary current draw as a result of a fault in the circulator blower 108, a fault elsewhere in the HVAC system, or any other possible anomaly within the HVAC system that causes a change in current draw by the circulator blower 108.

As described above, the processing module 1400 compares normalized data values, corresponding to the measured operating parameter data, to the operating parameter baseline. For example, the operating parameter may be current draw associated with the circulator blower 108. In the case of an ECM motor, when the processing module 1400 determines that the normalized data value is greater than the baseline, the processing module 1400 may then determine whether the normalized data value is greater than a predetermined threshold. In the case of a PSC motor, when the processing module 1400 determines that the normalized data value is less than the baseline draw, the processing module 1400 may then determine whether the normalized data value is less than a predetermined threshold.

The predetermined threshold may be determined based on characteristics of the components of HVAC system. Additionally or alternatively, the predetermined threshold may be set in response to the processing module 1400 learning the initial baseline. For example, the threshold may be set relative to the baseline. As the processing module 1400 learns the baseline, the threshold may be set at a relative value corresponding to the baseline. By way of non-limiting example, the threshold may be initially set at 5% above or below the baseline, depending on the particular component.

The threshold may be a value that allows the measured operating parameter data to be above or below an acceptable deviation from the baseline. For example, when the component is an ECM blower motor, the threshold may be a value that allows the measured operating parameter data, such as current, to be above an acceptable deviation from a baseline current. Likewise, for a PSC motor, the threshold corresponds to a value that allows the measured operating parameter data, such as current, to be below an acceptable deviation from the baseline. For example, as described above, the baseline may be a learned current draw average for the circulator blower 108. The actual current draw is expected to be at or near the baseline current draw when the HVAC system is operating within normal operating parameters. A dirty filter, however, may cause the HVAC system to operate outside of normal operating parameters.

As the baseline is updated or modified, a corresponding update or modification may be made to the threshold. The operating parameter may measure within an acceptable operating tolerance before the filter 104 begins collecting dirt or particles. For example, the circulator blower 108 may be said to be operating normally with an expected filter performance when the current draw is 5% more or less than the baseline current draw. However, when the circulator blower 108 is drawing current above or below this tolerance, the normalized data value may indicate a fault within the HVAC system, such as a dirty filter 104, for example.

When the processing module 1400 determines that the normalized data value is greater than the predetermined threshold in the case of an ECM motor, or below the predetermined threshold in the case of a PSC motor, the processing module 1400 may generate an alert indicating that the filter 104 is dirty. As described above, with respect to FIG. 3A, the processing module 1400 may communicate the alert to a technician for further analysis of the operating parameter data or to the customer alerting the customer to change the filter 104 of the HVAC system. Conversely, when the processing module 1400 determines that the normalized data value is not greater than the predetermined threshold in the case of an ECM motor or not less than the predetermined threshold in the case of a PSC motor, the processing module 1400 may simply store the normalized data value for future reference.

In some implementations, the processing module 1400 analyzes historical data associated with the circulator blower 108. For example only, as described above, the processing module 1400 determines whether a normalized data value corresponding to current draw is greater than a baseline in the case of an ECM motor or less than a baseline in the case of a PSC motor. For an ECM motor, when the processing module 1400 determines that the normalized data value is greater than the baseline, the processing module 1400 determines whether the normalized data value is also greater than the predetermined threshold. For a PSC motor, when the processing module 1400 determines that the normalized data value is less than the baseline, the processing module 1400 determines whether the normalized data value is also less than the predetermined threshold. When the processing module 1400 determines that the normalized data value is greater than or less than the predetermined threshold, as appropriate for an ECM or PSC motor, the processing module 1400 may then generate an alert indicating that the filter 104 within the HVAC system is faulty (i.e., dirty). Alternatively, the processing module 1400 may analyze historical data corresponding to the circulator blower 108 prior to generating the alert.

For example, the processing module 1400 is configured to store data associated with the circulator blower 108, previously analyzed operating parameter data. The processing module 1400 retrieves a normalized data value corresponding to one or more previous calendar days. The previous calendar day may, for example, be a previous consecutive day (i.e., the day before), the same day in a previous week, the same calendar day in a previous month, and so on.

The processing module 1400 may determine whether the normalized data value corresponding to the current draw of the circulator blower 108 has been greater than the predetermined threshold for more than a predetermined number of consecutive days for an ECM motor or less than the predetermined threshold for more than a predetermined number of consecutive days for a PSC motor. The predetermined number of consecutive days may be, for example only, two days. When the processing module 1400 determines that the normalized data value has not been greater or less than the predetermined threshold, as appropriate, for more than the predetermined number of consecutive days, the processing module 1400 may store the normalized data value data for future reference, without generating an alert.

Figure 6:
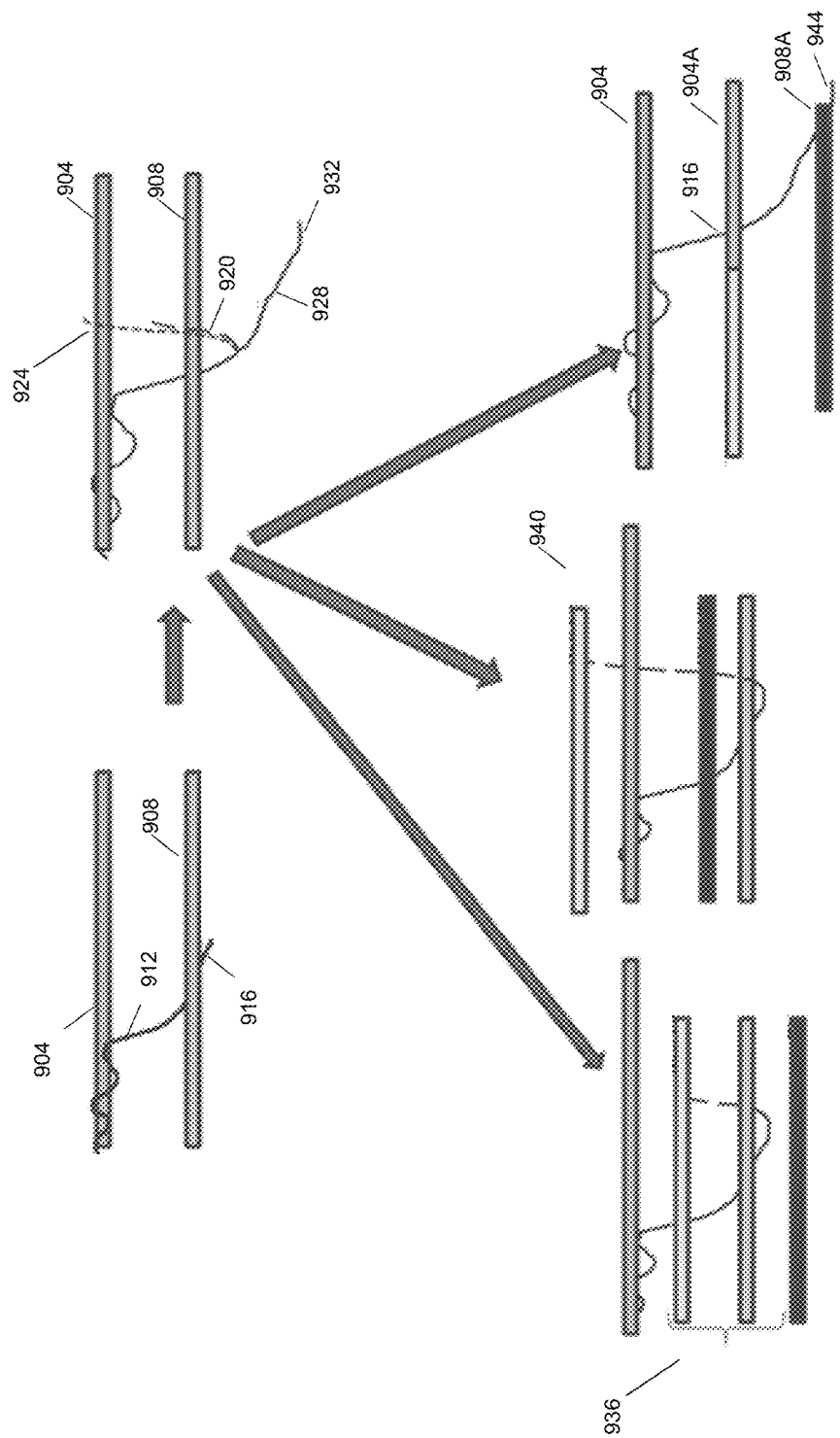
FIG. 6 is a graphical representation of operating parameter data associated with dynamic baseline threshold reestablishment.
Figure 8:
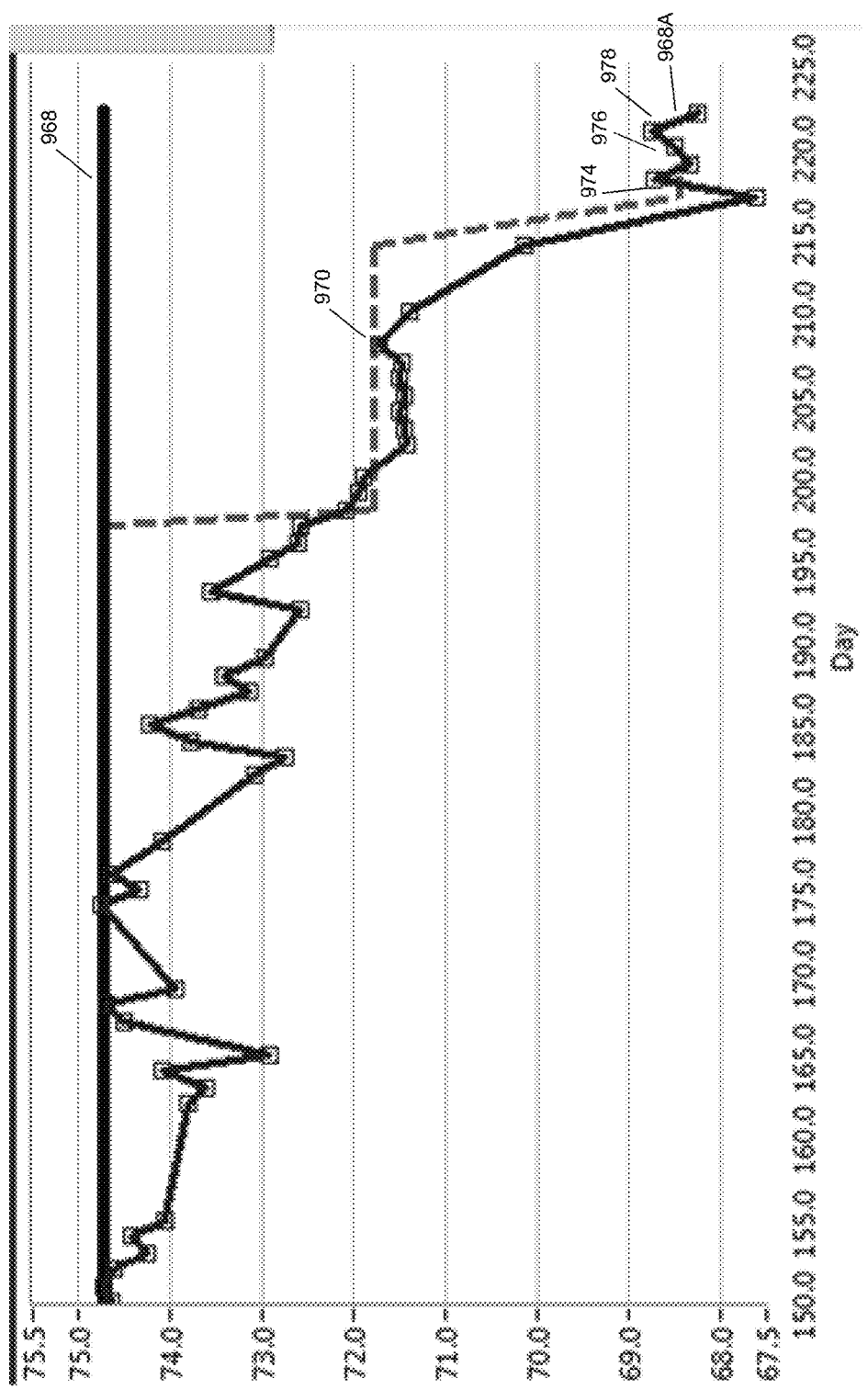
FIG. 8 is graphical representation of operating parameter data associated with dynamic baseline threshold reestablishment based on not changing a filter.

Conversely, when the processing module 1400 determines that the normalized data value has been greater than, or less than, the predetermined threshold, as appropriate, for more than two consecutive days, the processing module 1400 generates the alert as described above. As illustrated in FIG. 6, a first baseline 904 and a corresponding first threshold 908 are shown for an example PSC motor. While FIG. 8 illustrates current draw data decreasing, for example, as is expected when the circulator blower 108 comprises a PSC motor, as described above, the principles described relating to the circulator blower 108 comprising a constant torque ECM motor (i.e., analyzing increases in current draw) would merely be the mirror image of FIG. 6's illustrative example, with the first threshold 908 being above first baseline 904 and the normalized data values generally increasing over time instead of decreasing. At 912, the normalized data value is below the baseline 904; however, the normalized data value is not below the first threshold 908.

At 912, the processing module 1400 may store the normalized data value. At 916, the normalized data value is below the first threshold 908 for more than the predetermined time period, for example, a predetermined consecutive number of days. At 916, the processing module 1400 may generate an alert instructing the customer to replace the filter 104. At 920, the normalized data value indicates that the customer replaced the filter 104, as reflected by the general decrease in the normalized data value followed by a sudden increase in the normalized data value, with the sudden increase in normalized data value corresponding to the point in time where the customer replaced the filter 104 in an HVAC system with a PSC motor. Further, data subsequent to 920 indicates the circulator blower 108 is operating within normal parameters. In other words, the replacement filter may have restriction qualities similar to or higher than the original filter. At 924, the normalized data value is shown increasing beyond the baseline 904. This may indicate that the customer replaced the filter 104 with a less restrictive air filter. At 928, as an alternative example, the normalized data value indicates that the customer did not replace the filter 104 or that a replacement filter is faulty or buckled. At 932, the normalized data value indicates continued degraded performance of the air filter.

In some implementations, the processing module 1400 is configured to adaptively adjust the baseline. As described above, the baseline corresponds to an expected average motor current draw for the circulator blower 108 and may be a predetermined baseline based on the expected average. As with many electrical systems, such as the HVAC system, components operate within an acceptable tolerance. By way of non-limiting example only, the circulator blower 108 may be said to be operating within tolerance when an actual current draw is 5% more or less than the expected baseline current draw. Similarly, each subcomponent of the circulator blower 108 also operates within an acceptable tolerance. As can be appreciated, because each of these subcomponents may operate at slightly more or less than the expected value, the aggregate effect on the circulator blower 108 may be to operate constantly at a value different than the baseline current draw.

The processing module 1400 generates normalized data values corresponding to the measured current draw of the circulator blower 108 over time. The processing module 1400 is configured to analyze the normalized data value over a predetermined period. In one example, when the HVAC system is initially installed, the processing module 1400 may receive a baseline associated with the circulator blower 108 based on the type, make, model, and installation of the circulator blower 108 within the HVAC system. Alternatively, the processing module 1400 may learn a baseline within a period of time following the install of the HVAC system as described above. The processing module 1400 may be configured to use this received value as the baseline during an initial time period, such as the first month that the HVAC system is in operation.

At the end of the initial time period of operation, the processing module 1400 analyzes the normalized data value corresponding to the measured current draw of the circulator blower 108 over time. The processing module 1400 determines whether the normalized data value trend is greater than or less than the baseline. When the processing module 1400 determines the normalized data value trend is different than the baseline, the processing module 1400 may replace the baseline based on the normalized data value trend. For example, the new baseline may correspond to an average motor current draw over the initial time period.

In other words, the processing module 1400 may adjust the predetermined baseline based on actual measured performance of the circulator blower 108 to be, for example, equal to the current average motor current draw over the initial time period. In this manner, the processing module 1400 determines a baseline based on an actual performance rather than an expected performance.

In another implementation, the processing module 1400 may adjust the baseline in response to a sudden change in the normalized data value, where the sudden change in normalized data values indicates a change in the opposite direction of a normalized data value change indicative of particulate build up on the filter 104. For example, in the case of an ECM motor, an increase in current draw may be indicative of particulate build up on the filter 104 (i.e., the filter is dirty). Conversely, a sudden decrease in current draw is not indicative of particulate build up on the filter 104. It can be appreciated that the opposite is true for a PSC motor.

The processing module 1400 compares a first normalized data value to a second normalized data value. In one example, the processing module 1400 subtracts the absolute value of the first normalized data value from the absolute value of the second normalized data value. Additionally, the processing module 1400 may determine a rate of change between the normalized data values. The processing module 1400 determines whether the rate of change is greater than a rate of change threshold. When the processing module 1400 determines the rate of change is not greater than the rate of change threshold, the processing module 1400 stores the data. When the processing module 1400 determines the rate of change is greater than the rate of change threshold, the processing module 1400 adjusts the baseline. In some implementations, the processing module 1400 adjusts the baseline to be equal to the normalized data value. In other words, the processing module 1400 adjusts the baseline to equal the new expected current draw of the circulator blower 108. As can be appreciated, the circulator blower 108 may increase or decrease expected current draw for various reasons, including, but not limited to, a part replacement in the HVAC system, adjustable settings being reconfigured, and or the circulator blower 108 itself being replaced.

In another implementation, the processing module 1400 may adjust the baseline based on a density of a replacement filter 104. For example, the customer may replace a dirty filter 104 with a more restrictive or less restrictive filter 104. As can be appreciated, a more restrictive filter 104 may cause the circulator blower 108 to draw a different amount of current than a less restrictive air filter. As illustrated in FIG. 6 at 936, the baseline and threshold are shifted to accommodate a more restrictive air filter.

Similarly, at 940, the baseline and threshold are shifted to accommodate a less restrictive filter 104. The processing module 1400 may determine a filter 104 was replaced with a more or less restrictive filter 104 based on a trend analysis of normalized data values (similar to that described above with respect to the processing module 1400 adjusting the baseline in response to actual circulator blower 108 performance). Further, the processing module 1400 may receive input from the customer indicating the customer replaced the air filter with a more or less restrictive air filter. For example, the customer may input, via the customer device 324, the type of filter the customer used. Similarly, a contractor may input, via the contractor device 320, a type of filter the contractor used to replace a dirty air filter.

Figure 7:
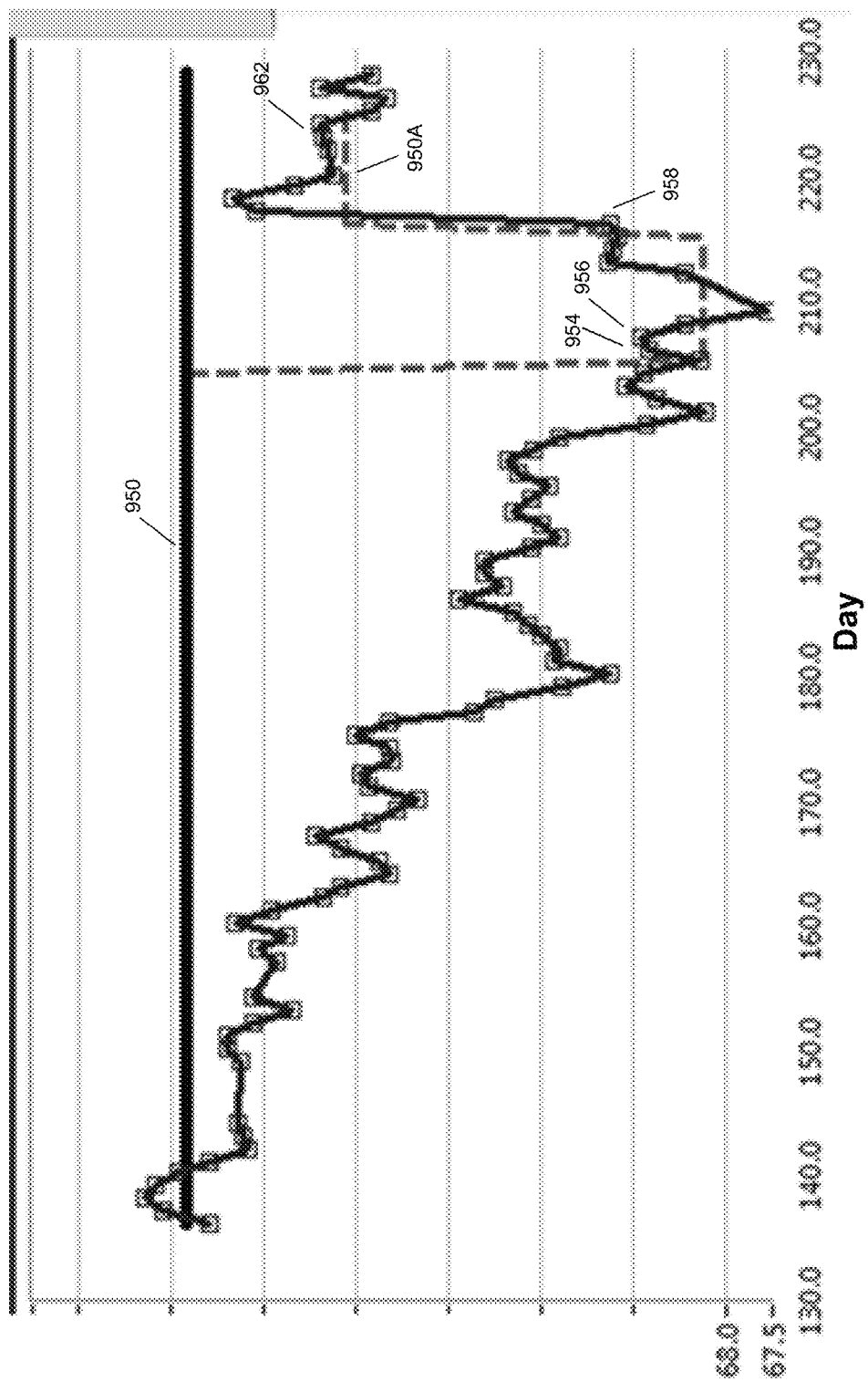
FIG. 7 is a graphical representation of operating parameter data associated with dynamic baseline threshold reestablishment based on a filter change.

As illustrated in FIG. 7, a baseline 950, corresponding to a PSC motor, is adjusted to 950a in response to the customer replacing a filter 104 with a more restrictive filter 104. At 954, the processing module 1400 determines that the normalized data value is below the threshold for the predetermined consecutive number of days. At 956, the processing module 1400 generates an alert instructing the customer to replace the filter 104. At 958, the customer replaces the filter 104 with a more restrictive filter 104. At 962, the processing module 1400 determines, after the predetermined consecutive number of days, that the customer replaced the filter 104 with a more restrictive filter 104. The processing module 1400 adjusts the baseline 950 to be equal to a new baseline at 950a.

In yet another implementation, the processing module 1400 adjusts the baseline in response to the customer not replacing a dirty air filter. For example, as described above, the processing module 1400 may generate an alert instructing the customer to replace a filter 104 within the HVAC system based on a determination that the filter 104 is dirty.

The processing module 1400 continues to analyze normalized data value corresponding to the current draw of the circulator blower 108.

The processing module 1400 determines whether the normalized data value is greater than the threshold. When the processing module 1400 determines that the normalized data value is greater than the threshold, in the case of a constant torque ECM motor, or less than the threshold, in the case of a PSC motor, and the processing module 1400 has previously generated an alert, the processing module 1400 stores the data. The processing module 1400 continues to monitor the normalized data values.

When the processing module 1400 determines the normalized data value is greater than the threshold, in the case of a constant torque ECM motor, or less than the threshold, in the case of a PSC motor, for a predetermined consecutive number of days and the processing module 1400 has previously generated the alert, the processing module 1400 adjusts the baseline and threshold, such that the baseline is set equal to the previous predetermined threshold and a new threshold is then set based on the new baseline. In this way, in the event the customer ignores an initial alert to change a dirty filter 104, a new baseline and predetermined threshold are set.

The processing module 1400 continues to monitor the normalized data values. When the processing module 1400 determines that the normalized data value is greater than the new adjusted threshold, in the case of a constant torque ECM motor, or less than the new adjusted threshold, in the case of a PSC motor, for the predetermined consecutive number of days, the processing module 1400 generates a severe alert and instructs the customer to replace the filter 104. In other words, when the customer does not respond to an initial alert instructing the customer to replace the filter 104, the processing module 1400 will generate a subsequent, more urgent, alert when the processing module 1400 determines a continued degraded performance of the filter 104 of the HVAC system. As can be appreciated, the processing module 1400 may monitor an amount of time that has passed since generating an alert instructing the customer to change the filter 104. The processing module 1400 may be configured to automatically continue to alert the customer in response to an amount of time passing after an initial alert was generated.

As illustrated in FIG. 6, the baseline 904 is adjusted to be equal to the previous threshold at 904a with a corresponding adjusted threshold 908a. At 944, the processing module 1400 determines that the normalized data value is below the predetermined threshold, in the case of a constant torque ECM motor, for the predetermined consecutive number of days. The processing module 1400 generates an urgent alert instructing the customer to replace the filter 104. As illustrated in FIG. 8, a baseline 968 is adjusted to a new baseline 970 in response to the customer not changing the filter 104. At 970, the processing module 1400 generates an alert instructing the customer to change the filter 104 and sets the baseline to be equal to new baseline. The processing module 1400 adjusts the threshold relative to the new baseline.

At 974, the processing module 1400 determines that the normalized data value is below the new threshold, in the case of a PSC motor, for the predetermined consecutive number of days. At 976, the processing module 1400 monitors normalized data values. At 978, the processing module 1400 determines that the normalized data value is below the predetermined threshold, in the case of a PSC motor, for the predetermined number of consecutive days and generates an urgent alert instructing the customer to replace the filter 104.

The processing module 1400 adjusts the baseline to be set equal to the new baseline at 968A and monitors normalized data values to determine further degradation from the new baseline.

As discussed above, the processing module 1400 may adjust the baseline for various reasons. As further discussed above, the predetermined threshold may be an offset value relative to the baseline. As the processing module 1400 adjusts the baseline, the predetermined threshold automatically adjusts relative to the baseline. In some implementations, the processing module 1400 may adjust the threshold independent of the baseline. For example, the processing module 1400 may be configured to monitor a total number of run-time hours of the HVAC system after the initial period or alternatively, from a time corresponding to a filter alert being sent. As the HVAC system runs, the amount of current shift due to particle buildup on the filter 104 may vary depending on the type motor and/or type of filter. In order to avoid delaying or missing filter alerts, the processing module 1400 may adjust the predetermined threshold (i.e., tighten the threshold or move the threshold closer to the baseline).

For example only, a threshold may be set within 5% of the baseline. After the HVAC system runs for 500 hours and no alert has been generated indicating the filter 104 is dirty or faulty, the threshold may be adjusted to be within 3% of the baseline. It is understood the values used in the examples are for illustrative purposes only, and any suitable values may be used depending on the characteristics of the HVAC system.

In another implementation, the processing module 1400 determines whether to adjust the predetermined threshold based on customer input. For example, as described above, the processing module 1400 generates an alert instructing the customer to replace an air filter. The customer may then interact with the customer device 324 to indicate an air filter change. Alternatively, the contractor may input information via the contractor device 328. For example, the customer may provide data indicating the actual condition of a filter 104 that was removed from the HVAC system (i.e., the air filter that the processing module 1400 determined was dirty). The customer may indicate that the filter 104 was, for example, very new, nearly new, somewhat dirty, ready to change, very dirty, extremely dirty, or overly dirty or buckled. It is understood that other descriptions or grading metrics may be used to communicate the condition of the replaced filter 104.

The processing module 1400 receives the input from the customer and may adjust the threshold based on the input. By way of non-limiting example, the processing module 1400 receives input indicating the air filter was very new. The processing module 1400 may then increase the threshold (i.e., relax the threshold) in order to delay a determination that the air filter is dirty.

In yet other implementations, the processing module 1400 may determine a rate of change of normalized data values over a predetermined period. For example, the processing module 1400 may determine a rate of change of normalized data values over a 14-day period. The processing module 1400 determines whether the rate of change is above a rate of change threshold and the direction of the change is indicative of particle accumulation on the filter 104. When the processing module 1400 determines the rate of change is above the threshold, the processing module 1400 generates the alert instructing the customer to change the filter. Conversely, when the processing module 1400 determines the rate of change is not above the threshold, the processing module 1400 stores the data.

It is understood that while the only current draw is described as the operating parameter, the operating parameter may include any suitable operating parameter of the HVAC system as described above. It is also understood that while only a current draw baseline and a current threshold are described, the baseline and threshold may be values associated with any operating parameter. For example, when the operating parameter is duct airflow, normalized data values corresponding to measured duct airflow is compared to a duct airflow baseline and a duct airflow threshold. Further, the methods described herein with respect to determining a current draw baseline also apply to any suitable operating parameter baseline. Similarly, the methods described herein with respect to determining and adjusting a current draw threshold apply to any suitable operating parameter threshold.

The processing module 1400 may also use power factor, which may be calculated based on the difference in phase between voltage and current. Temperature comparison between supply air and return air may be used, for example, to verify reduced flow and eliminate other potential reasons for observed current or power changes in the circulator blower motor. The processing module 1400 may also determine when an evaporator coil is blocked due to accumulated frost. For example, the processing module 1400 uses a combination of loading and thermal data to identify the signature of a coil that is freezing or frozen. This can be performed even when there is no direct temperature measurement of the coil itself.

Often, a frozen coil is caused by a fan failure, but the fan failure itself may be detected separately. The processing module 1400 may use return air temperature, supply air temperature, liquid line in temperature, voltage, current, real power, and FFT data from both the air handler unit and the compressor condenser unit. In addition, the processing module 1400 may monitor control line status, switch statuses, compressor discharge temperature, liquid line out temperature, and ambient temperature. When a change in loading occurs that might be indicative of a clogged filter, but the change happened suddenly, a different issue may have caused the change in loading other than a clogged or dirty filter.

In FIG. 4, an aggregate current level begins at a non-zero current 1004 indicating that at least one energy-consuming component is consuming energy. A spike in current 1008 may indicate that another component is turning on. Elevated current 1012, for example, may correspond to operation of the inducer blower. This is followed by a spike 1016, which may indicate the beginning of operation of a hot surface igniter. After opening of a solenoid-operated gas valve, the hot surface igniter may turn off, which returns current to a level corresponding to the inducer blower at 1018. The current may remain approximately flat 1020 until a current ramp 1024 begins, indicating the beginning of circulator blower operation. A spike 1028 may indicate transition from starting to running of the circulator blower.

Figure 5A:
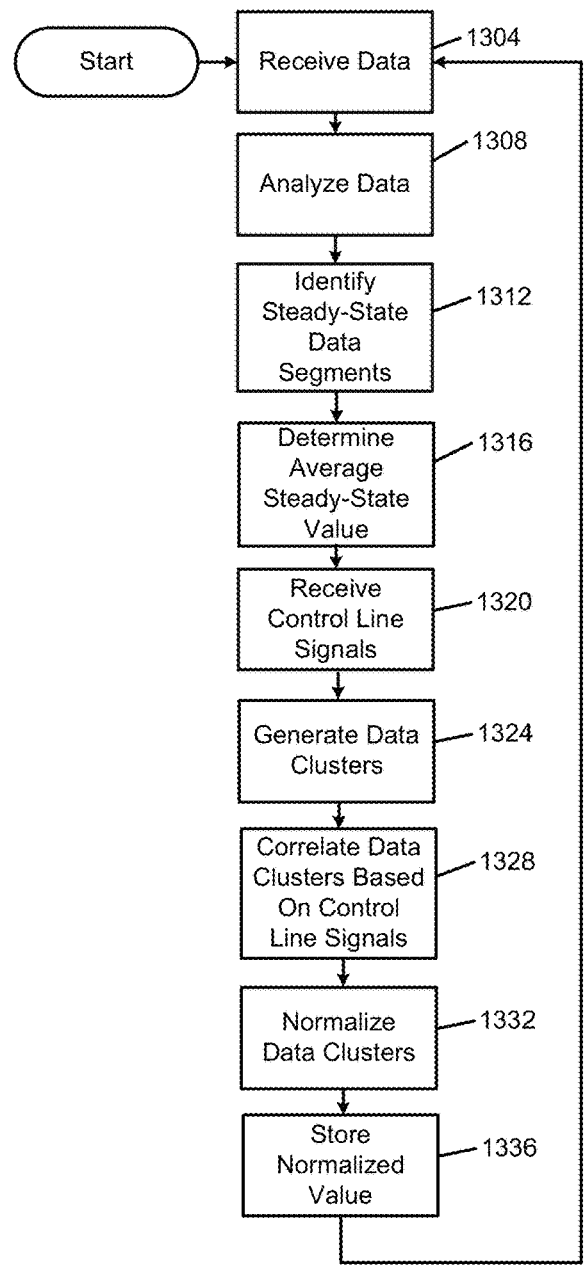
FIG. 5A is a flowchart of an example technique for normalizing operating parameter data associated with the HVAC system.

In FIG. 5A, a technique for normalizing operating parameter data associated with an HVAC system is shown. The technique begins at 1304 where measured operating parameter data is received from the local devices, for example only, the condensing monitor module 316 and the air handler monitor module 322. The technique continues at 1308 where, at the remote monitoring system, the data is analyzed by the processing module 1400. For example, the processing module 1400 identifies a portion of the measured operating parameter data that corresponds to an operating parameter value. At 1312, the processing module 1400 identifies steady-state segments of operating parameter data as described above.

At 1316, the processing module 1400 determines a plurality of steady-state values corresponding to an average of each of the steady-state segments.

At 1320, the processing module 1400 receives signals from the control lines indicating a mode as described above. At 1324, the processing module 1400 generates data clusters based on the steady-state values as described above. At 1328, the processing module 1400 correlates data clusters into groups based on the mode received form the control lines. In other words, the processing module 1400 identifies data clusters associated with the corresponding mode of operation and groups the data clusters together based on the modes of operation.

At 1332, the processing module 1400 normalizes the values within each data cluster. The processing module 1400 generates a normalized data value corresponding to each of the data clusters. For example, the processing module 1400 may determine an average value for each data cluster. Alternatively, the processing module 1400 may normalize data within each of the data clusters. The processing module 1400 may further generate a combined normalized data value corresponding to related data clusters as described above. At 1336, the processing module 1400 stores the normalized data values and returns to 1304.

Figure 5B:
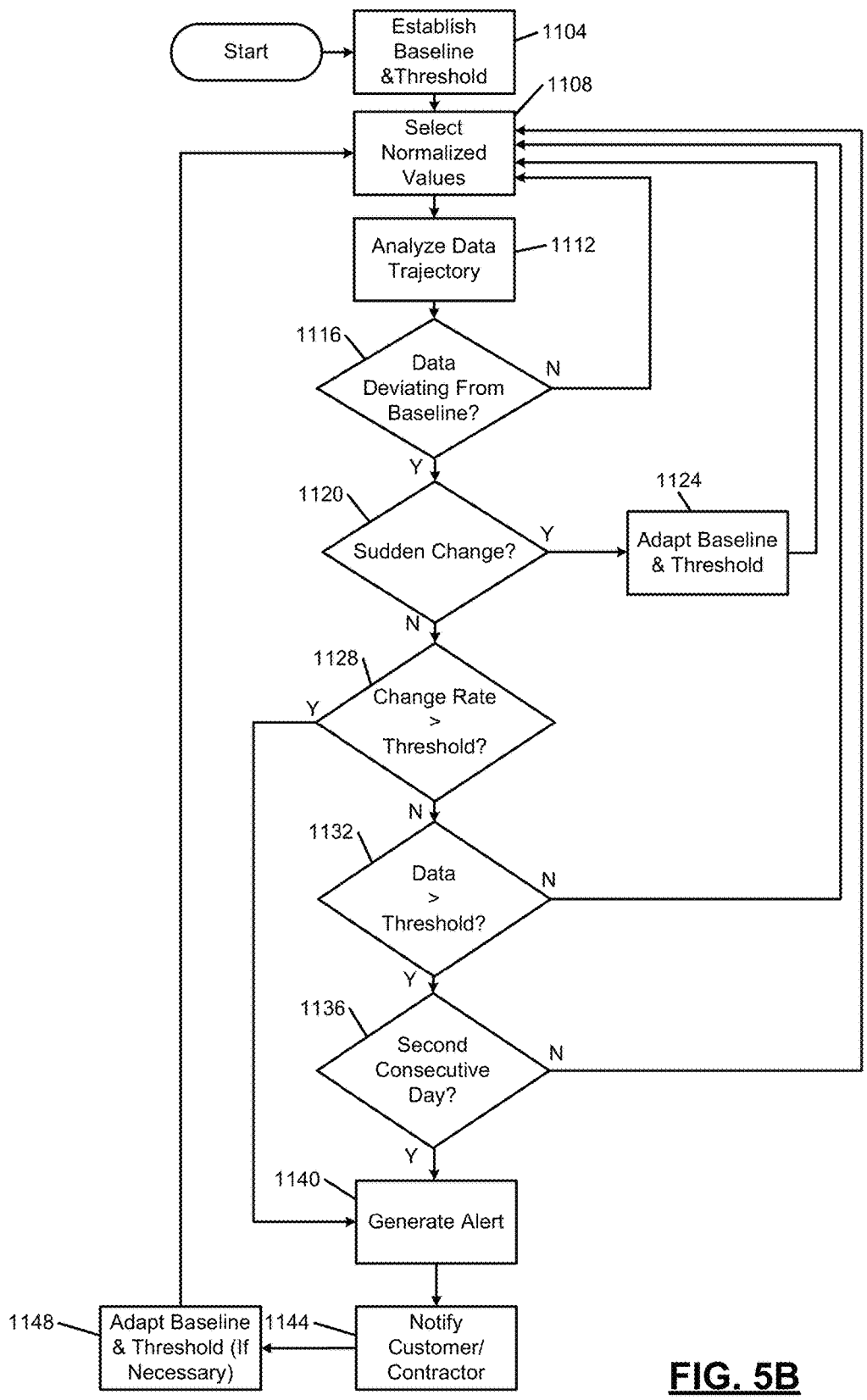
FIG. 5B is a flowchart of an example technique for diagnosing a fault in an air filter within an HVAC system.

In FIG. 5B, a technique for diagnosing a fault in an air filter within an HVAC system is shown. The technique begins at 1104, where an initial baseline and threshold are established during an initialization period. For example, the processing module 1400 establishes an initial baseline and threshold based on a trajectory analysis of the normalized data values. This may occur during the commissioning of a new monitoring system, which may be either in a new HVAC system or a retrofit installation. The normalized data values are analyzed over a predetermined initialization period of time, for example an initial 2 week period after the HVAC system is initiated or installed. During the predetermined initialization period, the normalized data values are analyzed to establish an average operating parameter value for the HVAC system.

The processing module 1400 determines an initial baseline and threshold based on the average operating parameter value. For example only, the processing module 1400 at 1104 sets the initial baseline equal to the average operating parameter value from the predetermined initialization period and sets the initial threshold relative to the baseline. The technique continues at 1108, where normalized data values are selected. The technique continues at 1112 where, at the remote monitoring system, the data is analyzed by the processing module 1400.

At 1116, the processing module 1400 determines whether a trajectory of the normalized data values deviates from the baseline. If false, the processing module 1400 returns to 1108. If true, the processing module 1400 continues at 1120. At 1120, the processing module 1400 determines whether the deviation from the baseline was a sudden change in the operating parameter. The processing module 1400 compares the present normalized data value to a predetermined number of historical data points. By way of non-limiting example only, the processing module 1400 compares the present data to data sets generated on the previous 5 consecutive days. It is understood that the processing module 1400 may be configured to compare the present data to data sets over any suitable time period.

The processing module 1400 determines a difference between the present data and each of the previously generated data sets. The processing module 1400 then determines a trend corresponding to the previously generated data sets and the present data. When the processing module 1400 determines a gradual change in operating parameter data (i.e., the previously generated normalized data values and the present normalized data value indicate a gradual increase or decrease in the operating parameter values) the processing module 1400 continues at 1128.

When the processing module 1400 determines a sudden change in the present normalized data value as compared to the previously generated normalized data values (i.e., the determined trend indicates a steady operating parameter value change over the previous 5 days and the present normalized data value varies from the previous 5 days) the processing module 1400 continues at 1124. It is understood that changes to components within the HVAC system may result in a change in operating parameter values. For example only, the customer may change an air filter within the HVAC system.

A replacement filter may have different air restriction characteristics than that of a previously installed air filter. For example, the replacement air filter may be more or less restrictive than the previous air filter, resulting in a change in the normalized data value. While only an air filter change is described, any change within the HVAC system may result in a change in operating parameter values of the HVAC system.

At 1124, the processing module 1400 adapts the baseline and threshold in response to the sudden change in normalized data value. For example only, the processing module 1400 may set the baseline equal to the normalized data value corresponding to the present normalized data value and sets the threshold relative to the adapted baseline. The processing module 1400 continues at 1108.

When at 1120 the deviation was not a sudden change in the operating parameter, the processing module 1400 proceeds to 1128. At 1128, the processing module 1400 determines whether a rate of change of normalized data values is greater than a rate of change threshold and is progressing in the direction of the filter developing dirt. The processing module 1400 determines a rate of change over a predetermined period. For example only, the processing module 1400 determines a rate at which the current draw is changing over the previous 5 consecutive days. It is understood the processing module 1400 may determine a rate of change over any suitable time period.

At 1128, the processing module 1400 determines whether the rate of change is in a direction that indicates particles are accumulating on the filter 104. For example, in an HVAC system including an ECM motor, an increase in current draw indicates particles are accumulating on the filter 104. When the HVAC system includes a PSC motor, a decrease in current draw indicates particles are accumulating on the filter 104. When the processing module 1400 determines at 1128 that the rate of change is not greater than the predetermined rate of change threshold, the technique continues at 1132, the technique continues at 1132.

At 1128 when the processing module 1400 determines the rate of change indicates particle accumulation on the filter 104, the processing module 1400 determines whether the rate of change is greater than the rate of change threshold. If false, the processing module 1400 continues at 1132. If true, the processing module 1400 continues at 1140. In other words, when the processing module 1400 determines that the normalized data value indicates the operating parameter values are changing at a greater rate than a predetermined rate and in the direction indicating particle accumulation on the filter 104, the processing module 1400 proceeds to 1140 and alerts the customer instructing the customer to change an air filter (as described below).

In this way, when the present normalized data value indicates a rate of change is greater than a rate of change threshold, an alert is generated at 1140. It is understood that the present normalized data value may be above or below the threshold relative to the baseline, however, a rate of change greater than the rate of change threshold will trigger an alert immediately. In other words, when the processing module 1400 determines the filter 104 is accumulating particles at a predetermined rate, the processing module 1400 does not wait for a number of consecutive days to pass in order to alert the customer.

At 1132, the processing module 1400 determines whether the normalized data value is greater than a predetermined threshold. For example, the predetermined threshold may be the initial threshold set at 1104. The predetermined threshold may be the adapted threshold set at 1124. Alternatively, depending on the component, the processing module 1400 may determine at 1132 whether the normalized data value is less than the predetermined threshold.

At 1132, if false, the processing module 1400 returns to 1108. If true, the processing module 1400 continues at 1136. At 1136, the processing module 1400 determines whether the present normalized data value has been above the threshold for two or more consecutive time periods, for example two or more consecutive days. If false, the processing module 1400 returns to 1108. If true, the processing module 1400 continues at 1140.

At 1140, the processing module generates an alert instructing the customer to replace an air filter. In this way, when the present normalized data value is greater than the threshold for two or more time periods at 1136, such as two or more days, an alert is generated at 1140. At 1144, the processing module 1400 communicates the alert to the customer and/or contractor. At 1148, the processing module 1400 may adapt the baseline and threshold as described above, if necessary. For example, the processing module 1400 may tighten the threshold, by moving the threshold closer to the baseline, in response to generating the alert. The processing module then returns to 1108.

Figure 5C:
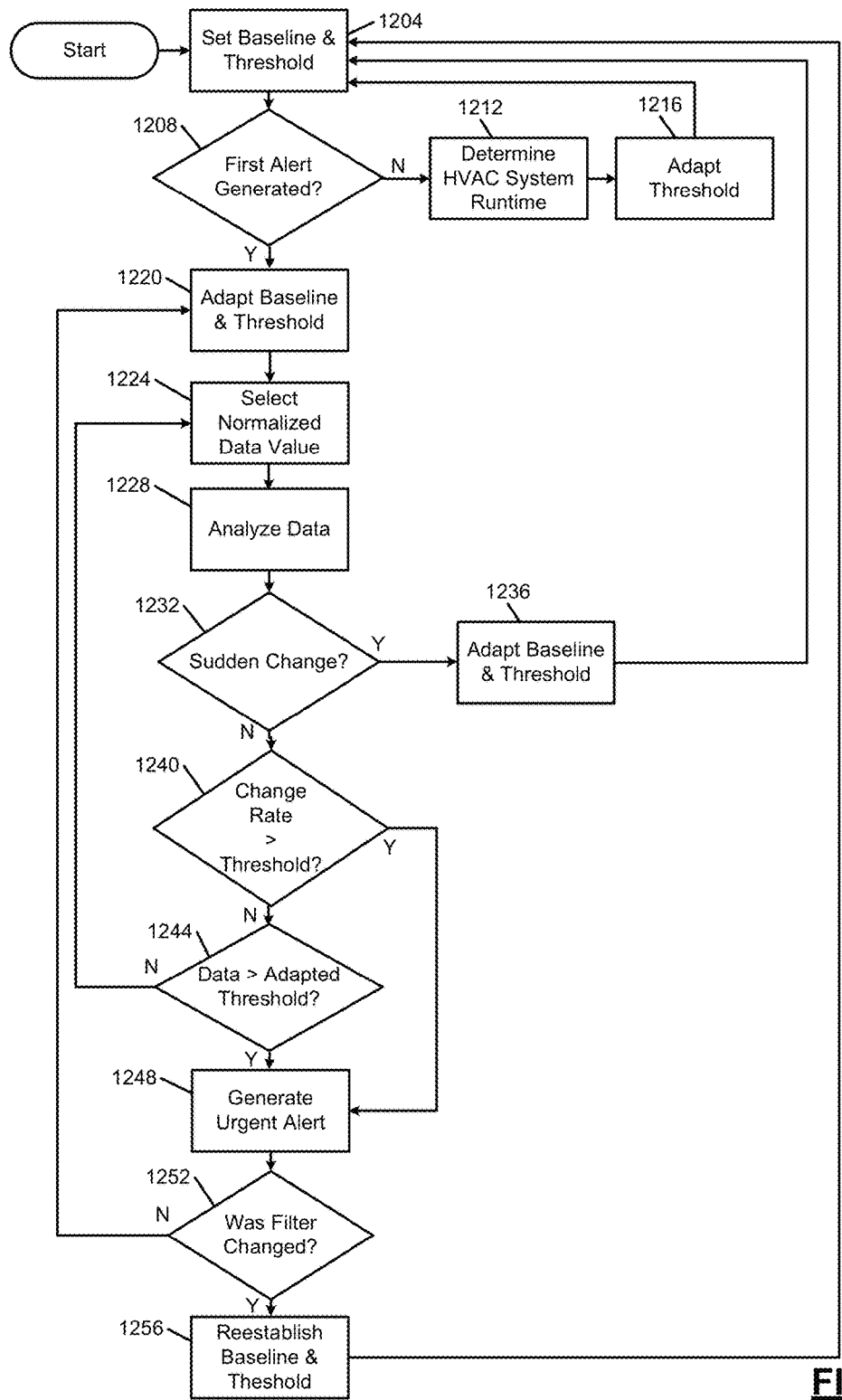
FIG. 5C is a flowchart of an example technique for adapting an operating parameter baseline and threshold.

In FIG. 5C, a technique for adapting an operating parameter baseline and threshold is shown. The technique begins at 1204, where an initial baseline and threshold are established during an initialization period. For example, operating parameter data is received and baseline operating parameter data is recorded by the processing module 1400. This may occur during the commissioning of a new monitoring system, which may be either in a new HVAC system or a retrofit installation. The operating parameter data is received over a predetermined initialization period of time such as, for example only, an initial 2 week period after the HVAC system is initiated or installed. During the predetermined initialization period, the operating parameter data is analyzed to establish an average operating parameter value for the HVAC system.

The processing module 1400 determines an initial baseline and threshold in response to the average operating parameter value. For example only, the processing module 1400 sets the initial baseline equal to the average operating parameter value and sets the initial threshold relative to the baseline. At 1208, the processing module 1400 determines if a first alert instructing a customer to change an air filter was generated. If false, the technique continues at 1212. If true, the technique continues at 1220.

At 1212, the processing module 1400 determines an HVAC system runtime since the last filter change. For example, the processing module 1400 determines a period of time that has elapsed since the previous filter change. At 1216, the processing module 1400 adapts the threshold in response to the runtime. For example, as the runtime increases, the processing module 1400 may decrease a difference between the baseline and the threshold. In other words, as more time passes since the last filter change, the threshold may be modified to become closer to the baseline and, as result, the system becomes less tolerant of deviations from the baseline in normalized data values. The technique continues at 1204. At 1204, the processing module 1400 sets the threshold equal to the adapted threshold.

At 1220, the processing module 1400 adapts the baseline and threshold in response to the first alert being generated. The processing module 1400 sets the baseline to be equal to the previous threshold (i.e., the threshold used to determine whether the air filter is dirty as described above) and sets the new threshold relative to the new baseline.

At 1224 the processing module 1140 selects normalized data values from the stored normalized data values. The technique continues at 1228 where, at the remote monitoring system, the data is analyzed by the processing module 1400.

At 1232, the processing module 1400 determines whether the deviation was a sudden change in normalized data values, as described above with reference to reference numeral 1120 of FIG. 5B. When the processing module 1400 determines a gradual change in data the processing module 1400 continues at 1240.

When the processing module 1400 determines a sudden change in the present data as compared to the previously generated data the processing module 1400 continues at 1236. At 1236, the processing module 1400 adapts the baseline and threshold in response to the sudden change in normalized data values. For example only, the processing module 1400 sets the baseline equal to the normalized data value corresponding to the present normalized data value and sets the threshold relative to the adapted baseline. The processing module 1400 continues at 1204.

At 1240, the processing module 1400 determines whether a rate of change of normalized data values is greater than a rate of change threshold and is progressing in the direction of indicating particle accumulation on the filter 104, as described above with reference to reference numeral 1128 of FIG. 5B. When the processing module 1400 determines that the rate of change indicates particle accumulation on the filter 104, the processing module 1400 determines whether the rate of change is greater than the rate of change threshold. If false, the processing module 1400 continues at 1244. If true, the processing module 1400 continues at 1248.

At 1244, the processing module 1400 determines whether the normalized data value is greater than the adapted threshold. Alternatively, the processing module 1400 may determine whether the normalized data value is less than the adapted threshold, depending on the component. If false, the technique continues at 1224. If true, the technique continues at 1248. At 1248, the processing module 1400 generates an urgent alert. The urgent alert may instruct the customer to replace the air filter and indicate that failure to replace the air filter may result in a decrease in efficiency of the HVAC system. At 1252 the processing module 1400 determines whether the air filter was changed based on the received data. If false, the technique continues at 1220. It true, the technique continues at 1256. At 1256, the processing module 1400 reestablishes the baseline and threshold as described above.

As an alternative to, or In addition to, comparing the normalized data value to a particular baseline and threshold, the processing module 1400 may perform a trend analysis of the normalized data over time. For example, the trend analysis may include performing an evaluation of how strongly the normalized data values for the monitored operating parameter are trending in a particular direction. For example, the trend analysis may include evaluating how strongly the normalized data values are increasing or decreasing over time. For example, a trend analysis may be performed whereby the normalized data values for the operating parameter are analyzed over time and a trend confidence level or score is assigned periodically corresponding to the apparent strength of the particular trend, either increasing or decreasing, for the normalized data value at that point in time. In this way, using a trend analysis may remove the need to determine and adjust baselines and thresholds, as discussed above in the context of comparing operating data values and trends to baselines and thresholds.

For example, the trend analysis may include using a Mann-Kendall trend analysis technique to periodically assign trend confidence levels to the normalized data values for the particular operating parameter over time. The Mann-Kendall analysis provides an indication of whether a trend exists and whether the trend is positive or negative. More specifically, the analysis uses pair-wise comparisons of each data point with all preceding data points, and determines the number of increases, decreases, and ties. A statistic (S) is then calculated whereby the number of decreases is subtracted from the number of increases. The number of ties does not increase or decrease S. An upward or increasing trend is indicated when S has a positive value. A downward or decreasing trend is indicated when S has a negative value. The magnitude of S indicates the strength of the trend in the indicated direction.

Further a nonparametric correlation coefficient (T) can be calculated, based on the statistic S, to evaluate the nonparametric correlation between two data series. The nonparametric correlation coefficient T may be a scaled measure of the statistic S, calculated based on the following formula:

$$T = S/[n(n-1)/2], \quad (1)$$

where n is the number of data values in the series and S is statistic calculated based on the pair-wise comparison described above. The resulting nonparametric correlation coefficient T ranges from −1 to 1, whereby −1 indicates a strong downward trend and 1 indicates a strong upward trend.

Figure 9:
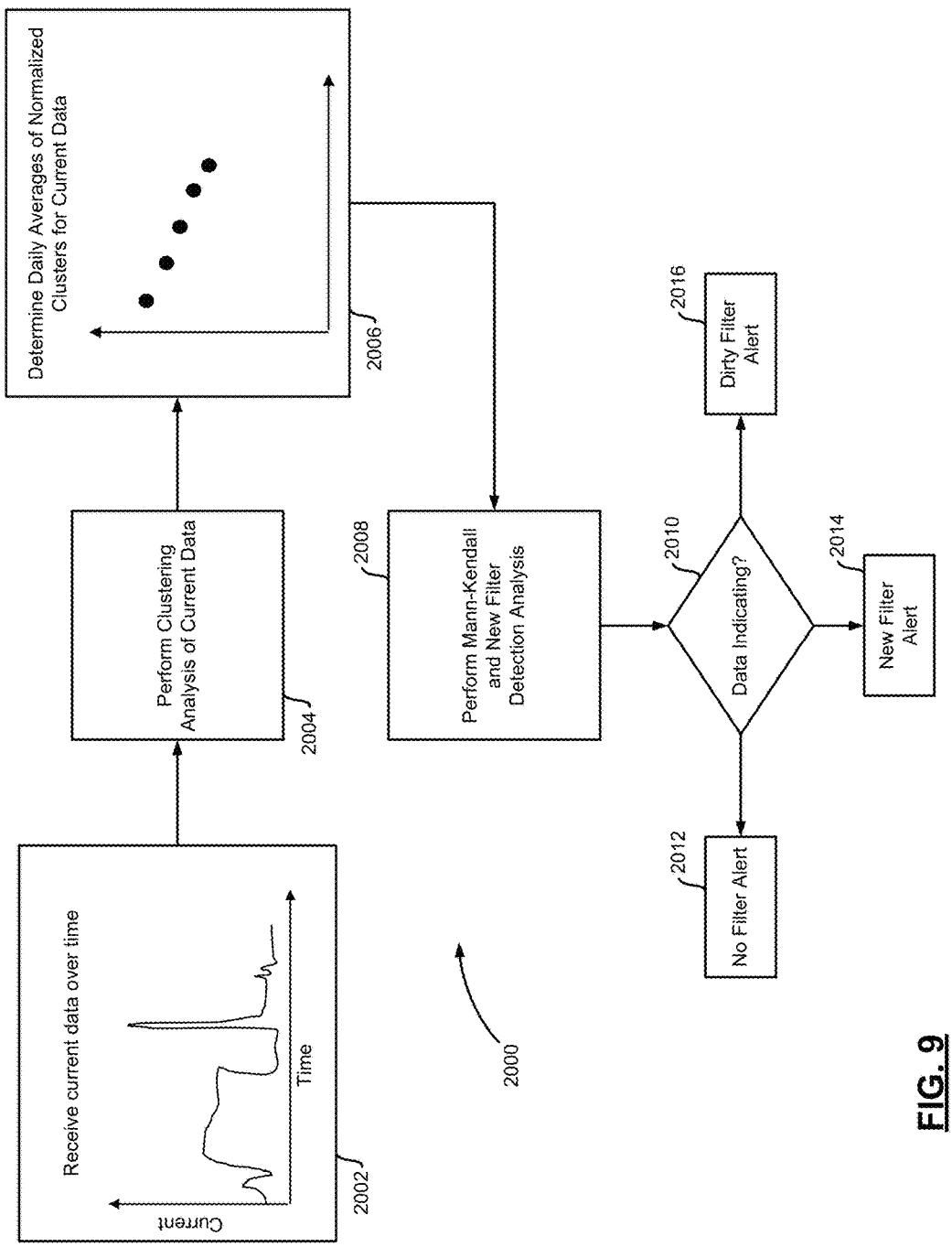
FIG. 9 is a flowchart of an example technique for performing a trend analysis of operating parameter data.

With reference to FIG. 9, a flowchart 2000 is shown for performing a trend analysis of operating data using a Mann-Kendall analysis. While electrical current data is shown in this example, any operating parameter, as described above, may be used. At 2002, current data is received over time by the processing module 1400. At 2004, the processing module 1400 performs a clustering analysis of the current data, as described above, for example, in connection with FIG. 5A. At 2006, the processing module 1400 calculates daily averages of the normalized clusters for the current data. Although daily averages are used in this example, averages of the normalized clusters for the current data may be calculated over any other time period, including, for example, one or more days, weeks, or months, etc. At 2008, the processing module 1400 performs the Mann-Kendall trend analysis on the resulting daily averages to determine whether the current data is strongly trending in an upward or downward direction, as described in further detail below. In addition, at 2008, the processing module 1400 performs a new filter detection analysis to determine whether the data indicates that the filter has been replaced. At 2010, the processing module 1400 determines whether an alert is appropriate. For example, when the data does not yet indicate a strong trend, no filter alert is generated at 2012. When the data indicates that the filter 104 has been replaced, a new filter alert is generated at 2014. When the data indicates a strong upward or downward trend, the processing module 1400 generates a dirty filter alert at 2016.

Figure 10:
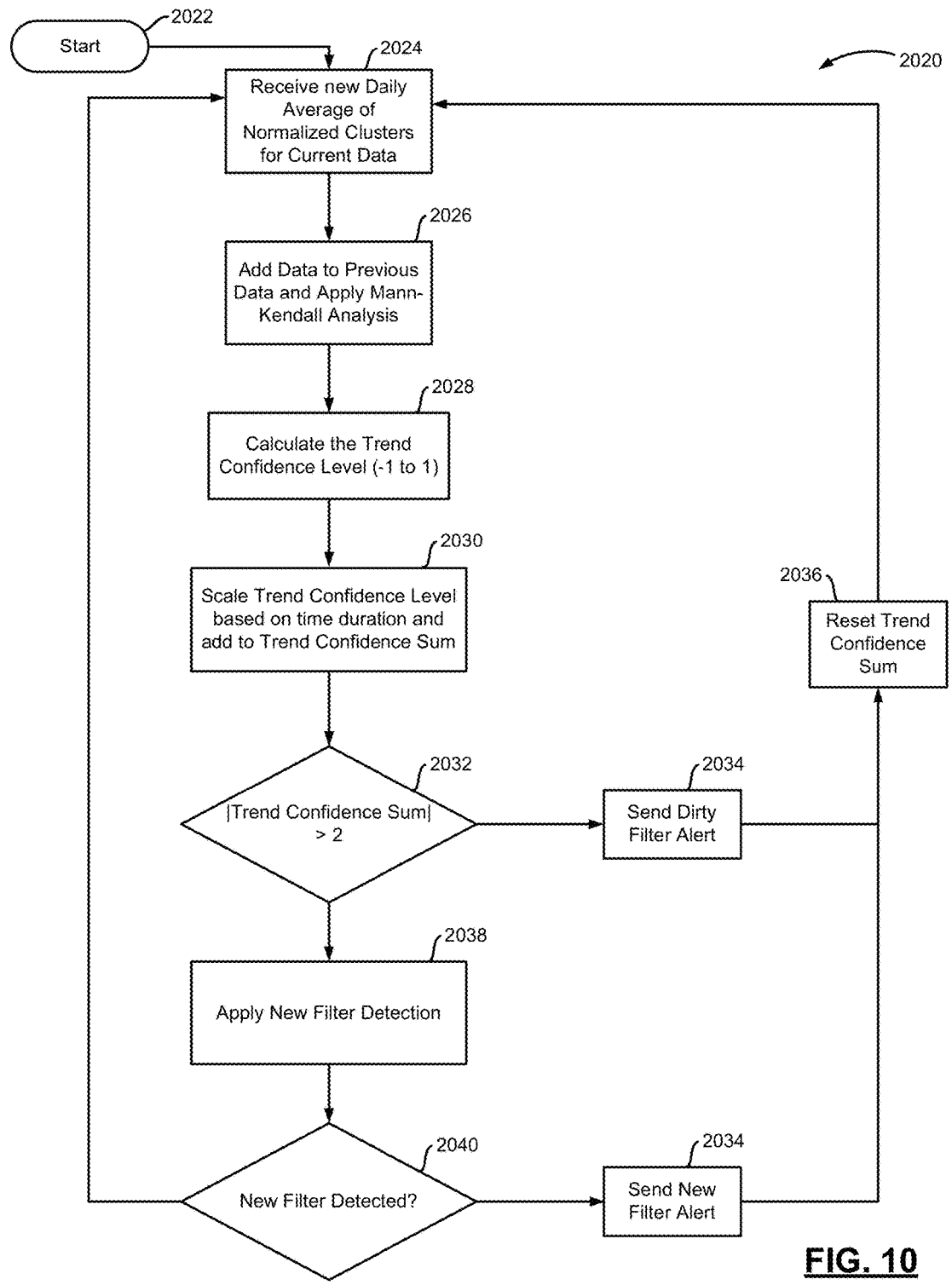
FIG. 10 is a flowchart for generating alerts based on a trend analysis of operating parameter data.

With reference to FIG. 10, a flowchart 2020 is shown with further details for performing the Mann-Kendall and new filter detection analysis. The processing module 1400 starts at 2022. At 2024, the processing module receives a new daily average of a normalized cluster for the electrical current data. Again, while electrical current data is shown in this example, any operating parameter, as described above, may be used. At 2026, the processing module 1400 adds the data to the existing dataset of previous data and applies the Mann-Kendall analysis described above. At 2028, based on the Mann-Kendall the analysis, the processing module 1400 calculates the trend confidence level, in the range of −1 to 1. The trend confidence level corresponds to the nonparametric correlation coefficient (T) described above.

At 2030, the processing module 1400 scales the trend confidence level based on time duration and adds the scaled trend confidence level to a trend confidence sum. The scaling is based on the time duration represented by the current data sample being added to the data set versus the time duration represented by the existing data set of previous data. For example, a confidence level corresponding to one week will be appropriately scaled or weighted when added to, for example, previous data corresponding to six weeks.

At 2032, the processing module 1400 determines whether the absolute value of the trend confidence sum is greater than a predetermined threshold. In this example, the predetermined threshold used is 2. However, any other appropriate predetermined threshold value may be used, depending on how often alerts are desired to be generated.

At 2032, when the absolute value of the trend confidence sum is greater than 2, the processing module 1400 proceeds to 2034 and generates a dirty filter alert. The processing module then proceeds to 2036 and resets the trend confidence sum to 0. The processing module 1400 then loops back to 2024 and starts the trend analysis again.

At 2032, when the absolute value of the trend confidence sum is not greater than 2, the processing module 1400 proceeds to 2038 and applies a new filter detection algorithm. For example, the processing module 1400 may determine whether the current data is within three sigma of the average data over time. When the current data is not within three sigma of the average data, and has stayed outside of three sigma of the average data for a predetermined time period, for example two days, then the processing module 1400 may determine that the filter has been replaced.

At 2040, the processing module 1400 determines whether a new filter was detected by the new filter detection algorithm at 2038. When a new filter is detected at 2040, the processing module 1400 generates a new filter alert at 2034. The processing module 1400 then proceeds to 2036 and resets the trend confidence sum to 0. The processing module 1440 then loops back to 2024 and starts the trend analysis again. At 2040, when a new filter is not detected, the processing module loops back to 2024 and continues with the trend analysis.

Figure 11:
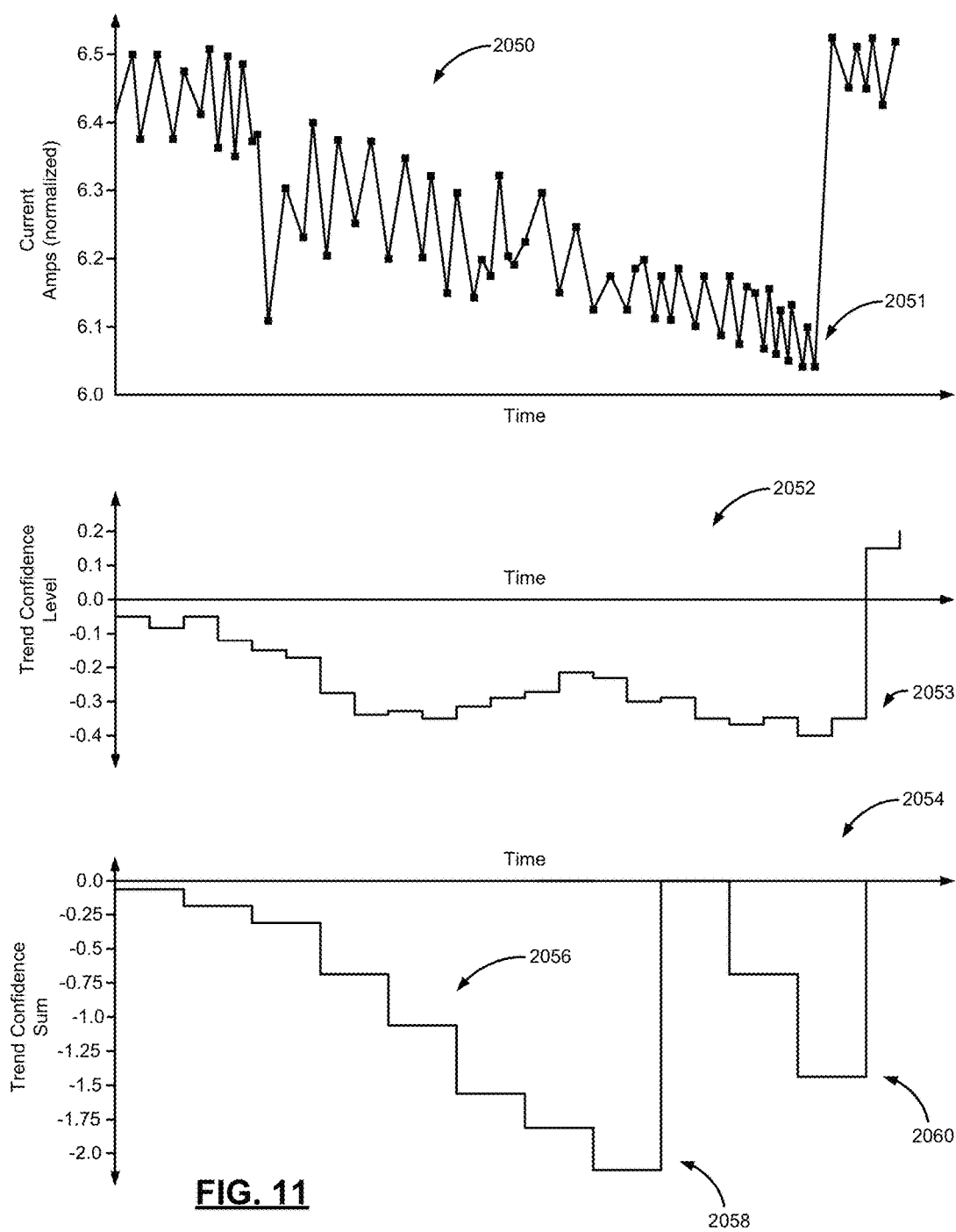
FIG. 11 is a graphical representation of operating parameter data, a trend confidence level, and a trend confidence sum over time.

With reference to FIG. 11, a graphical representation of operating parameter data, a trend confidence level, and a trend confidence sum over time is shown. At 2050, a graphical representation of daily averages of normalized data clusters over time are shown. For example, each square in the graph at 2050 represents a daily average. At 2051, the data indicates that the filter 104 has been replaced with a new filter, as shown by the spike in current. While the graph at 2050 is shown using current data in amps, as an example, any operating parameter data may be used, as discussed in detail above.

At 2052, a graphical representation of the trend confidence levels, calculated using the Mann-Kendall analysis for the data of 2050, over time is shown. As depicted in 2052, the trend confidence level is generally a negative number, indicating a downward trend, until 2053, when the trend confidence level moves to a positive level, corresponding to the filter 104 being replaced with a new filter.

At 2054, a graphical representation of the trend confidence sum over time is shown. As shown in 2054, the time period for which each trend confidence sum is made generally corresponds to the width of each step in the graph. However, the trend confidence sum can be updated more frequently, or less frequently, as desired. As shown at 2056, the trend confidence sum increases in negative magnitude until it reaches 2058, at which point the trend confidence sum is greater than the predetermined threshold, which in this case is 2. As discussed above, other predetermined thresholds can be used depending on the desired frequency of alerts. At 2058, with the trend confidence sum greater then 2, a dirty filter alert is generated, and the trend confidence sum is reset to 0. The trend confidence sum again begins to increase in negative magnitude, until it reaches 2060. At 2060, the filter 104 has been replaced with a new filter and the trend confidence sum is reset to 0.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A monitoring system for a heating, ventilation, or air conditioning (HVAC) system of a building, the monitoring system comprising:
   a monitoring device having a current sensor at the building that measures current draw of a circulator blower of the HVAC system, the circulator blower having a plurality of stages;
   a monitoring server, located remotely from the building, configured to (i) receive operating parameter data, including current draw data, from the monitoring device at the building, (ii) identify steady-state segments in the operating parameter data, each steady-state segment including only operating data generated during steady-state operation of the circulator blower at one of the plurality of stages and excluding operating data generated while the circulator blower is in a start-up state between when the circulator blower is initiated and when the circulator blower reaches steady-state operation at one of the stages and excluding operating data generated while the circulator blower transitions between steady-state operation at a first stage of the plurality of stages and steady-state operation at a second stage of the plurality of stages, (iii) generate a plurality of data clusters from the operating parameter data based on the identified steady-state segments, each data cluster of the plurality of data clusters including operating data from steady-state segments that correspond to operation of the circulator blower at the same stage of the plurality of stages, (iv) calculate an average operating parameter value for each data cluster, (v) calculate normalized operating parameter values based on normalizing the average operating parameter values for the data clusters over a predetermined normalization time period, (vi) compare the normalized operating parameter values with a threshold, (vii) determine whether an air filter of the HVAC system needs to be replaced based on the comparison, (viii) generate a notification based on the determination indicating that the air filter needs to be replaced, (ix) communicate the notification to a customer device associated with the HVAC system, and (x) adjust the threshold after the notification is communicated to the customer device.

2. The monitoring system of claim 1, wherein the monitoring server sets the threshold relative to a baseline operating parameter value for the HVAC system, the baseline operating parameter value corresponding to at least one of: a predetermined expected operating parameter value for the HVAC system; and an average operating parameter value for the HVAC system over an initialization time period.

3. The monitoring system of claim 1, wherein the monitoring server identifies the steady-state segments in the operating parameter data based on a determination that a variance of a data segment within the operating parameter data is within a predetermined range of a variance threshold.

4. The monitoring system of claim 1, wherein the monitoring server identifies the steady-state segments in the operating parameter data based on a determination that a rate of change of values within the operating parameter data is within a predetermined range of a rate threshold.

5. A method for monitoring a heating, ventilation, or air conditioning (HVAC) system of a building, the method comprising:
   measuring, with a monitoring device having a current sensor at the building, current draw of a circulator blower of the HVAC system, the circulator blower having a plurality of stages;
   receiving, with a monitoring server located remotely from the building, operating parameter data, including current draw data, from the monitoring device at the building;
   identifying, with the monitoring server, steady-state segments in the operating parameter data, each steady-state segment including only operating data generated during steady-state operation of the circulator blower at one of the plurality of stages and excluding operating data generated while the circulator blower is in a start-up state between when the circulator blower is initiated and when the circulator blower reaches steady-state operation at one of the stages and excluding operating data generated while the circulator blower transitions between steady-state operation at a first stage of the plurality of stages and steady-state operation at a second stage of the plurality of stages;
   generating, with the monitoring server, a plurality of data clusters from the operating parameter data based on the identified steady-state segments, each data cluster of the plurality of data clusters including operating data from steady-state segments that correspond to operation of the circulator blower at the same stage of the plurality of stages;
   calculating, with the monitoring server, an average operating parameter value for each data cluster;
   calculating, with the monitoring server, normalized operating parameter values based on normalizing the average operating parameter values for the data clusters over a predetermined normalization time period;
   comparing, with the monitoring server, the normalized operating parameter values with a threshold;
   determining, with the monitoring server, whether an air filter of the HVAC system needs to be replaced based on the comparison;
   generating, with the monitoring server, a notification based on the determining indicating that the air filter needs to be replaced;
   communicating, with the monitoring server, the notification to a customer device associated with the HVAC system; and
   adjusting the threshold after communicating the notification to the customer device.

6. The method of claim 5, further comprising setting, with the monitoring server, the threshold relative to a baseline operating parameter value for the HVAC system, the baseline operating parameter value corresponding to at least one of: a predetermined expected operating parameter value for the HVAC system; and an average operating parameter value for the HVAC system over an initialization time period.

7. The method of claim 5, wherein identifying the steady-state segments in the operating parameter data is based on a determination that a variance of a data segment within the operating parameter data is within a predetermined range of a variance threshold.

8. The method of claim 5, wherein identifying the steady-state segments in the operating parameter data is based on a determination that a rate of change of values within the operating parameter data is within a predetermined range of a rate threshold.

9. A monitoring system for a heating, ventilation, or air conditioning (HVAC) system of a building, the monitoring system comprising:
a monitoring device having a current sensor at the building that measures current draw of a circulator blower of the HVAC system, the circulator blower having a plurality of stages;
a monitoring server, located remotely from the building, configured to (i) receive operating parameter data, including current draw data, from the monitoring device at the building, (ii) identify steady-state segments in the operating parameter data, each steady-state segment including only operating data generated during steady-state operation of the circulator blower at one of the plurality of stages and excluding operating data generated while the circulator blower is in a start-up state between when the circulator blower is initiated and when the circulator blower reaches steady-state operation at one of the stages and excluding operating data generated while the circulator blower transitions between steady-state operation at a first stage of the plurality of stages and steady-state operation at a second stage of the plurality of stages, (iii) generate a plurality of data clusters from the operating parameter data based on the identified steady-state segments, each data cluster of the plurality of data clusters including operating data from steady-state segments that correspond to operation of the circulator blower at the same stage of the plurality of stages, (iv) calculate an average operating parameter value for each data cluster, (v) calculate normalized operating parameter values based on normalizing the average operating parameter values for the data clusters over a predetermined normalization time period, (vi) perform a trend analysis of the normalized operating parameter values by comparing each normalized operating parameter value with previous normalized operating parameter values, (vii) determine a trend for the normalized operating parameter values associated with each normalized operating parameter value, (viii) associate a trend confidence level with each normalized operating parameter value, (ix) determine whether an air filter of the HVAC system needs to be replaced based on the trend analysis, (x) generate a notification based on the determination indicating that the air filter needs to be replaced, and (xi) communicate the notification to a customer device associated with the HVAC system.

10. The monitoring system of claim 9, wherein the trend analysis includes calculating a sum of the trend confidence levels for each normalized operating parameter value and wherein the monitoring server determines that the air filter needs to be replaced when the sum is greater than a threshold.

11. The monitoring system of claim 10, wherein the monitoring server resets the sum once the monitoring server determines that the air filter needs to be replaced.

12. The monitoring system of claim 10, wherein the monitoring server determines that the air filter has been replaced and resets the sum once the monitoring server determines that the air filter needs to be replaced.

13. A method for monitoring a heating, ventilation, or air conditioning (HVAC) system of a building, the method comprising:
measuring, with a monitoring device having a current sensor at the building, current draw of a circulator blower of the HVAC system, the circulator blower having a plurality of stages;
receiving, with a monitoring server located remotely from the building, operating parameter data, including current draw data, from monitoring device at the building of the HVAC system;
identifying, with the monitoring server, steady-state segments in the operating data, each steady-state segment including only operating data generated during steady-state operation of the circulator blower at one of the plurality of stages and excluding operating data generated while the circulator blower is in a start-up state between when the circulator blower is initiated and when the circulator blower reaches steady-state operation at one of the stages and excluding operating data generated while the circulator blower transitions between steady-state operation at a first stage of the plurality of stages and steady-state operation at a second stage of the plurality of stages;
generating, with the monitoring server, a plurality of data clusters from the operating parameter data based on the identified steady-state segments, each data cluster of the plurality of data clusters including operating data from steady-state segments that correspond to operation of the circulator blower at the same stage of the plurality of stages;
calculating, with the monitoring server, an average operating parameter value for each data cluster;
calculating, with the monitoring server, normalized operating parameter values based on normalizing the average operating parameter values for the data clusters over a predetermined normalization time period;
performing, with the monitoring server, a trend analysis of the normalized operating parameter values by comparing each normalized operating parameter value with previous normalized operating parameter values, determining a trend for the normalized operating parameter values associated with each normalized operating parameter value, and associating a trend confidence level with each normalized operating parameter value;
determining, with the monitoring server, whether an air filter of the HVAC system needs to be replaced based on the trend analysis;
generating, with the monitoring server, a notification based on the determination indicating that the air filter needs to be replaced; and
communicating, with the monitoring server, the notification to a customer device associated with the HVAC system.

14. The method of claim 13, wherein performing the trend analysis includes calculating a sum of the trend confidence levels for each normalized operating parameter value and wherein the monitoring server determines that the air filter needs to be replaced when the sum is greater than a threshold.

15. The method of claim 13, further comprising resetting the sum, with the monitoring server, once the monitoring server determines that the air filter needs to be replaced.

16. The method of claim 13, further comprising determining, with the monitoring server, that the air filter has been replaced and resetting the sum, with the monitoring server, once the monitoring server determines that the air filter needs to be replaced.

* * * * *